(12) United States Patent
Sato et al.

(10) Patent No.: US 12,294,328 B2
(45) Date of Patent: May 6, 2025

(54) POWER CONVERSION DEVICE

(71) Applicant: Hitachi Industrial Equipment Systems Co., Ltd., Tokyo (JP)

(72) Inventors: Fumihiro Sato, Tokyo (JP); Keisuke Tanabe, Tokyo (JP); Naoki Takata, Tokyo (JP); Daisuke Matsumoto, Tokyo (JP); Shigetoshi Yagihara, Tokyo (JP); Masahiro Hiraga, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 363 days.

(21) Appl. No.: 18/013,942

(22) PCT Filed: Oct. 29, 2021

(86) PCT No.: PCT/JP2021/040173
§ 371 (c)(1),
(2) Date: Dec. 30, 2022

(87) PCT Pub. No.: WO2022/092304
PCT Pub. Date: May 5, 2022

(65) Prior Publication Data
US 2023/0291334 A1    Sep. 14, 2023

(30) Foreign Application Priority Data
Nov. 2, 2020  (WO) ............... PCT/JP2020/041111

(51) Int. Cl.
| | |
|---|---|
| *H02P 3/18* | (2006.01) |
| *H02M 1/00* | (2006.01) |
| *H02M 5/458* | (2006.01) |
| *H02P 3/22* | (2006.01) |

(52) U.S. Cl.
CPC ............ *H02P 3/22* (2013.01); *H02M 1/0009* (2021.05); *H02M 5/4585* (2013.01)

(58) Field of Classification Search
CPC ...... H02P 3/22; H02M 1/0009; H02M 5/4585
See application file for complete search history.

(56) References Cited

U.S. PATENT DOCUMENTS 5,608,301 A * 3/1997 Inaniwa ............... H02P 23/07
   363/39
2014/0313621 A1  10/2014 Innes et al.
(Continued)

FOREIGN PATENT DOCUMENTS

| DE | 102022118849 A1 * | 3/2023 | ............ H02M 1/322 |
| EP | 3595159 A1 * | 1/2020 | ............ G01R 31/52 |

(Continued)

OTHER PUBLICATIONS

International Search Report (PCT/ISA/210) issued in PCT Application No. PCT/JP2021/040173 dated Jan. 18, 2022 with English translation (six (6) pages).
(Continued)

*Primary Examiner* — Adolf D Berhane
(74) *Attorney, Agent, or Firm* — Crowell & Moring LLP

(57) ABSTRACT

With the aim of improving the reliability of a power conversion device for driving a motor, this power conversion device is provided with a rectifying portion for rectifying an AC voltage and outputting a DC voltage, a smoothing capacitor for smoothing the DC voltage, an inverter portion into which the DC voltage is input and which outputs AC power, an inverter drive portion for outputting a gate signal to the inverter portion, a regenerative braking portion connected in parallel with the smoothing capacitor, a regenerative braking drive portion for outputting a gate signal to the regenerative braking portion, a control portion for outputting drive signals to the inverter drive portion and the regenera-
(Continued)

tive braking drive portion, a regenerative braking overcurrent detecting portion for outputting an overcurrent detection signal if the current flowing through the regenerative braking portion exceeds a determination value, and a latch portion into which the overcurrent detection signal output from the regenerative braking overcurrent detecting portion is input and which outputs a gate output interruption signal to the control portion, wherein switching elements of the inverter portion and the regenerative braking portion stop in an off state when the regenerative braking overcurrent detection portion detects an overcurrent.

15 Claims, 15 Drawing Sheets

(56) References Cited

U.S. PATENT DOCUMENTS

| | | | |
|---|---|---|---|
| 2018/0097440 A1* | 4/2018 | Wang | H02M 7/53871 |
| 2024/0204700 A1* | 6/2024 | Seo | H02M 1/0009 |

FOREIGN PATENT DOCUMENTS

| | | |
|---|---|---|
| JP | 61-214781 A | 9/1986 |
| JP | 3-60390 A | 3/1991 |
| JP | 3-98472 A | 4/1991 |
| JP | 2002-315352 A | 10/2002 |
| JP | 2008-252966 A | 10/2008 |
| JP | 2013-27114 A | 2/2013 |

OTHER PUBLICATIONS

Japanese-language Written Opinion (PCT/ISA/237) issued in PCT Application No. PCT/JP2021/040173 dated Jan. 18, 2022 (five (5) pages).
Extended European Search Report issued in European Application No. 21886421.3 dated Aug. 28, 2024 (10 pages).

* cited by examiner

FIG. 8
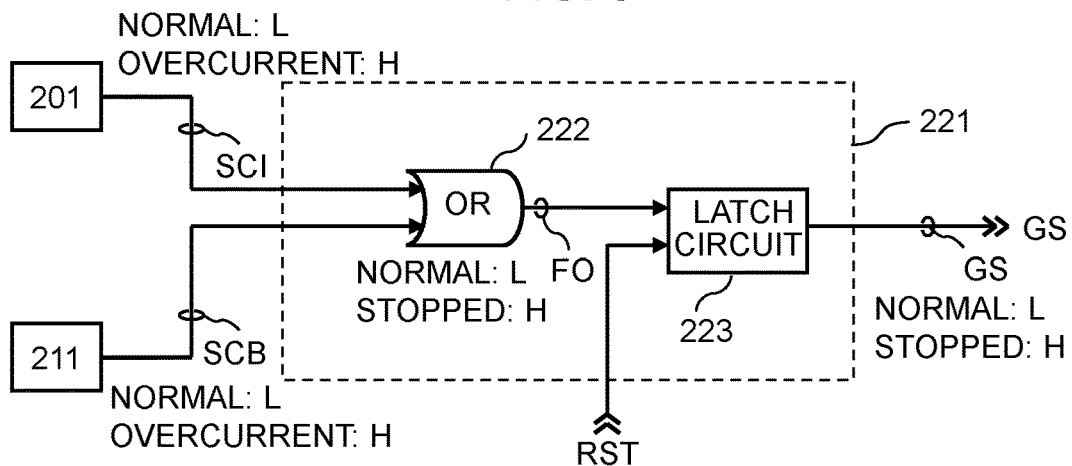
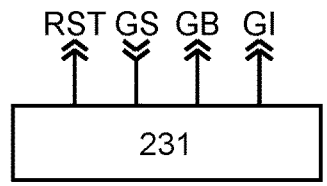
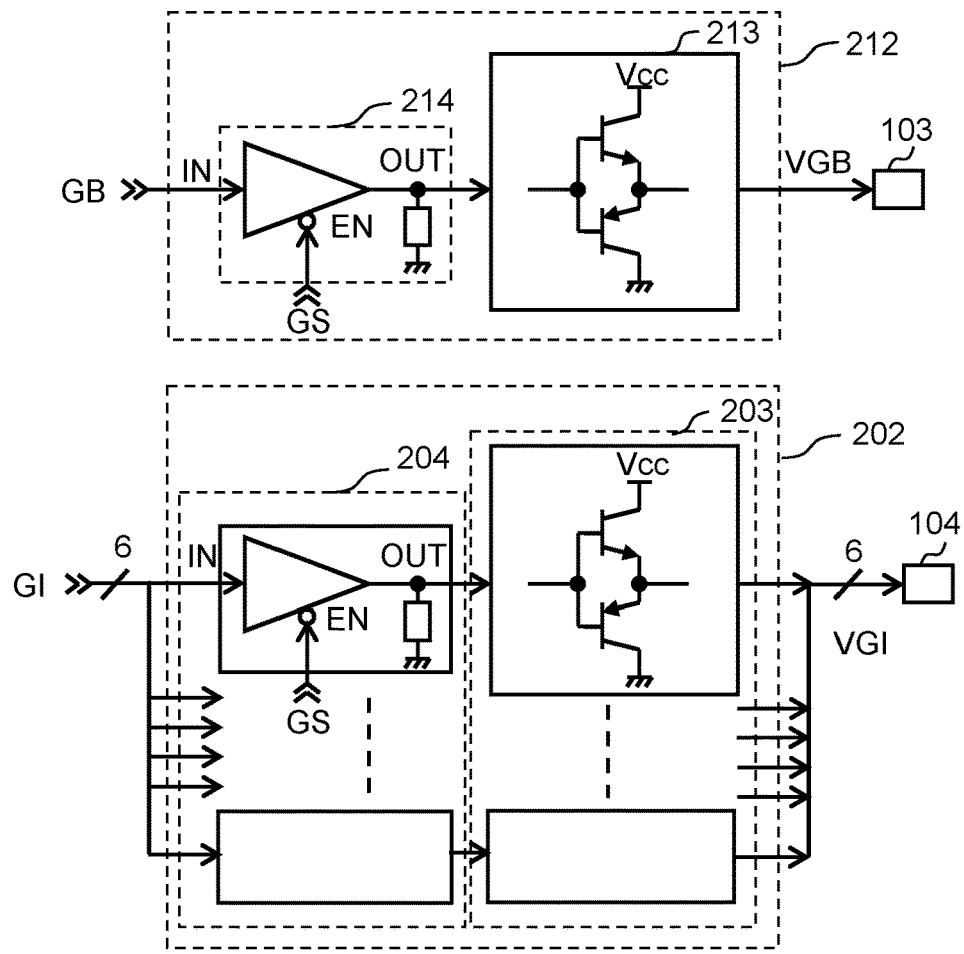

POWER CONVERSION DEVICE

TECHNICAL FIELD

The present invention relates to a power conversion device that supplies AC power to a motor.

BACKGROUND ART

A power conversion device for motor drive generally consists of a rectifying portion that converts AC voltage to DC voltage, a smoothing capacitor that smoothes DC voltage, and an inverter portion that inversely converts DC voltage. The inverter portion converts the DC voltage into AC power for motor drive and supplies it to the motor during powering operation, and converts the AC power regenerated by the motor into DC power and supplies it to the smoothing capacitor during regenerative operation. Therefore, during regenerative operation of the motor, the regenerative energy charges the smoothing capacitor through the inverter circuit, so that the DC voltage rises.

In order to prevent the DC voltage from exceeding the withstand voltage of the smoothing capacitor during regenerative operation of the motor, a regenerative braking portion consisting of a braking resistor and a switching element in series is placed in parallel with the smoothing capacitor, and the switching element of the regenerative braking portion is driven when the DC voltage exceeds a predetermined voltage, and a method of consuming regenerative energy with the braking resistor is generally known. The resistance value and power rating of the braking resistor and the allowable current of the switching element depend on the amount of regenerative energy to be consumed, so it is necessary to select the appropriate one for each device.

If a lower resistance than originally required is connected to the braking resistor, or if both ends of the braking resistor are accidentally short-circuited, there is a concern that a larger current than expected will flow through the switching element and the switching element will be destroyed. Also, if a lower power rating than originally required is connected to the braking resistor, there is concern that the braking resistor may burn out. Therefore, it is desirable for power conversion device for motor drive to be equipped with an overcurrent protection circuit in the regenerative braking portion to improve reliability.

A prior art document in this technical field is Patent Document 1. Patent Document 1 describes a power conversion device equipped with a current interrupting means in series with a braking resistor and a switching element, and a protection mechanism that interrupts the current flowing through the braking resistor when an overcurrent is detected.

CITATION LIST

Patent Document

Patent Document 1: JP 2002-315352 A

SUMMARY OF THE INVENTION

Problems to be Solved by the Invention

In the Patent Document 1, a contactor with a thermal relay is connected in series with a braking resistor, and when the thermal relay trips due to overcurrent, the contactor is turned off, preventing the braking resistor from burning out. However, Patent Document 1 does not mention the operation of the inverter portion when the braking resistor detects an overcurrent, and there is a problem that when the thermal relay trips, the rise in the DC voltage, which is the original purpose, cannot be suppressed.

Solutions to Problems

The present invention, in one example, is a power conversion device, comprising: a rectifying portion for rectifying an AC voltage and outputting a DC voltage, a smoothing capacitor for smoothing the DC voltage, an inverter portion into which the DC voltage is input and which outputs AC power, an inverter drive portion for outputting a gate signal to the inverter portion, a regenerative braking portion connected in parallel with the smoothing capacitor, a regenerative braking drive portion for outputting a gate signal to the regenerative braking portion, a control portion for outputting drive signals to the inverter drive portion and the regenerative braking drive portion, a regenerative braking overcurrent detecting portion for outputting an overcurrent detection signal if the current flowing through the regenerative braking portion exceeds a determination value, and a latch portion into which the overcurrent detection signal output from the regenerative braking overcurrent detecting portion is input and which outputs a gate output interruption signal to the control portion, wherein switching elements of the inverter portion and the regenerative braking portion stop in an off state when the regenerative braking overcurrent detection portion detects an overcurrent.

Effects of the Invention

According to the present invention, it is possible to suppress a rise in DC voltage while preventing the destruction of the braking resistor and the switching element of the regenerative braking portion.

BRIEF DESCRIPTION OF THE DRAWINGS

FIG. 8 is a configuration diagram showing specific examples of the latch portion, regenerative braking drive portion, and inverter drive portion in the second embodiment.

MODE FOR CARRYING OUT THE INVENTION

Hereinafter, embodiments of the present invention will be described with reference to the drawings.

First Embodiment

Figure 1:
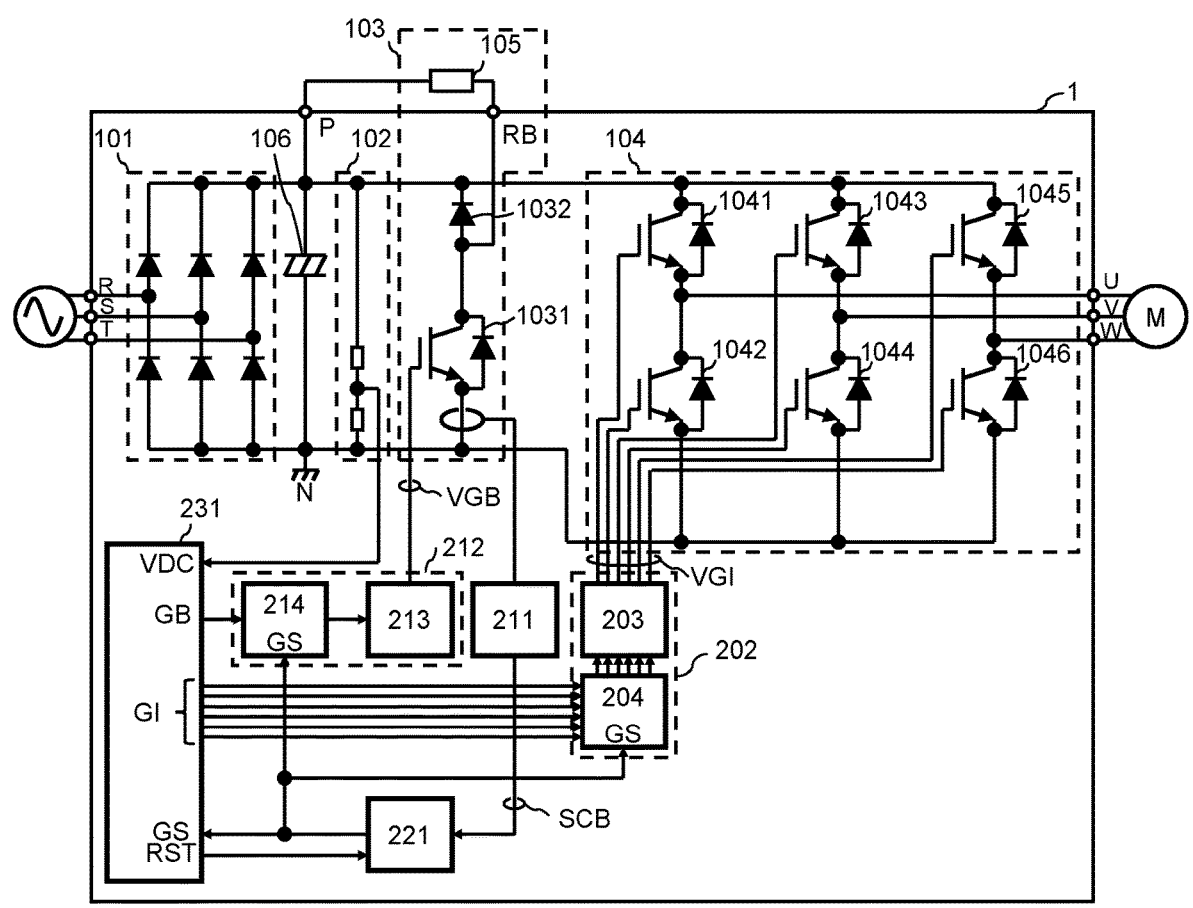
FIG. 1 is a configuration diagram of a power conversion device in a first embodiment.

FIG. 1 is a configuration diagram of a power conversion device in the present embodiment. In FIG. 1, the power conversion device 1 includes a rectifying portion 101 that inputs AC voltage and outputs DC voltage, a smoothing capacitor 106 for smoothing the DC voltage, a voltage detection portion 102 that detects the value of the DC voltage output by the rectifying portion 101, a regenerative braking portion 103 that operates to suppress a rise in the DC voltage when the voltage value detected by the voltage detection portion 102 exceeds a predetermined value, a regenerative braking portion 212 that outputs a gate signal VGB to the regenerative braking portion 103, and a regenerative braking overcurrent detection portion 211 that outputs an overcurrent detection signal SCB when a current flowing through the regenerative braking portion 103 exceeds a judgment value. Furthermore, the power conversion device 1 includes an inverter portion 104 that converts DC voltage to AC power, an inverter drive portion 202 that outputs a gate signal VGI to the inverter portion 104, a control portion 231 that outputs drive signals GB and GI to the regenerative braking drive portion 212 and the inverter drive portion 202, and a latch portion 221 that outputs a gate output interruption signal GS to the regenerative braking drive portion 212, the inverter drive portion 202, and the control portion 231 when the regenerative braking overcurrent detection portion 211 outputs the overcurrent detection signal SCB.

The rectifying portion 101 consists of at least six diodes and converts the AC input from input terminals R, S, and T into DC voltage and outputs it to both electrodes of the smoothing capacitor 106. The rectifying action of the diodes in the rectifying portion 101 generates a DC voltage with a positive voltage on the DC voltage wiring on the node P side and a negative voltage on the DC voltage wiring on the node N side. The smoothing capacitor 106 is connected to the DC voltage wires at node P and node N to smooth the voltage between the wires.

The inverter portion 104 is composed of switching elements 1041 to 1046. When the motor is operated under powering operation, the DC voltage in the smoothing capacitor 106 is converted to AC power and output to the motor, and when the motor is operated under regenerative operation, the switching elements 1041 to 1046 operate to charge the regenerative energy from the motor into the smoothing capacitor. Although the switching elements shown in FIG. 1 use IGBT circuit symbols as representative examples, but other power semiconductors such as MOS-FETs can also be used.

The regenerative braking portion 103 consists of a switching element 1031, a braking resistor 105, and diode 1032. The regenerative braking portion 103 drives the switching element 1031 when the DC voltage value detected by the voltage detection portion 102 becomes higher than a predetermined value, causes braking resistor 105 to consume energy, and suppresses a rise in the DC voltage. Therefore, the braking resistor 105 increases the braking torque of the inverter portion 104, and is connected under conditions where regenerative energy is relatively large, such as when the inverter portion 104 is repeatedly turned on and off frequently, or when decelerating the motor with a large load inertia moment.

The regenerative braking drive portion 212 consists of a buffer portion 214, a gate drive portion 213, receives the drive signal GB output by the control portion 231 and outputs the gate signal VGB to the regenerative braking portion 103.

Similarly, the inverter drive portion 202 also consists of a buffer portion 204, a gate drive portion 203, receives the drive signal GI output by the control portion 231 and outputs the gate signal VGI to the inverter portion 104.

The regenerative braking overcurrent detection portion 211 outputs the overcurrent detection signal SCB to the latch portion 221, when the current flowing through the regenerative braking portion 103 exceeds the determination value due to factors such as connecting a braking resistor 105 with a resistance value lower than the specified value or a short circuit between node P and RB shown in FIG. 1 due to a connection error.

The latch portion 221 is composed of a flip-flop or the like, and outputs a gate output cutoff signal GS to the control input terminals of the buffer portions 214 and 204 when the regenerative braking overcurrent detection portion 211 detects an overcurrent. When the buffer portions 214 and 204 receive the gate output cutoff signal GS, regardless of the drive signals GB and GI output from the control portion 231, the buffer portions 214 and 204 transition the output of the gate signals VGB and VGI so as to stop the switching elements of the regenerative braking portion 103 and the inverter portion 104 in the off state. This enables gate output cutoff operation in the event of an overcurrent in the regenerative braking portion 103.

The latch portion 221 receives a reset signal RST from the control portion 231 to release the stop, and the regenerative braking drive portion 212 and the inverter drive portion 202 output the gate signal VGB and VGI based on the drive signals GB and GI output from the control portion 231, and the driving of the regenerative braking portion 103 and the inverter portion 104 is resumed.

When the control portion 231 receives the gate output cutoff signal GS of the latch portion 221, the control portion 231 changes the output of the drive signals GB and GI to the regenerative braking drive portion 212 and the inverter drive portion 202 so as to stop the switching element of the regenerative braking portion 103 and the inverter portion 104 in the OFF state. As a result, when an overcurrent flows in the regenerative braking portion 103, in addition to the gate output cutoff by the buffer portions 214 and 204 described above, a double protection system can be established.

Figure 2:
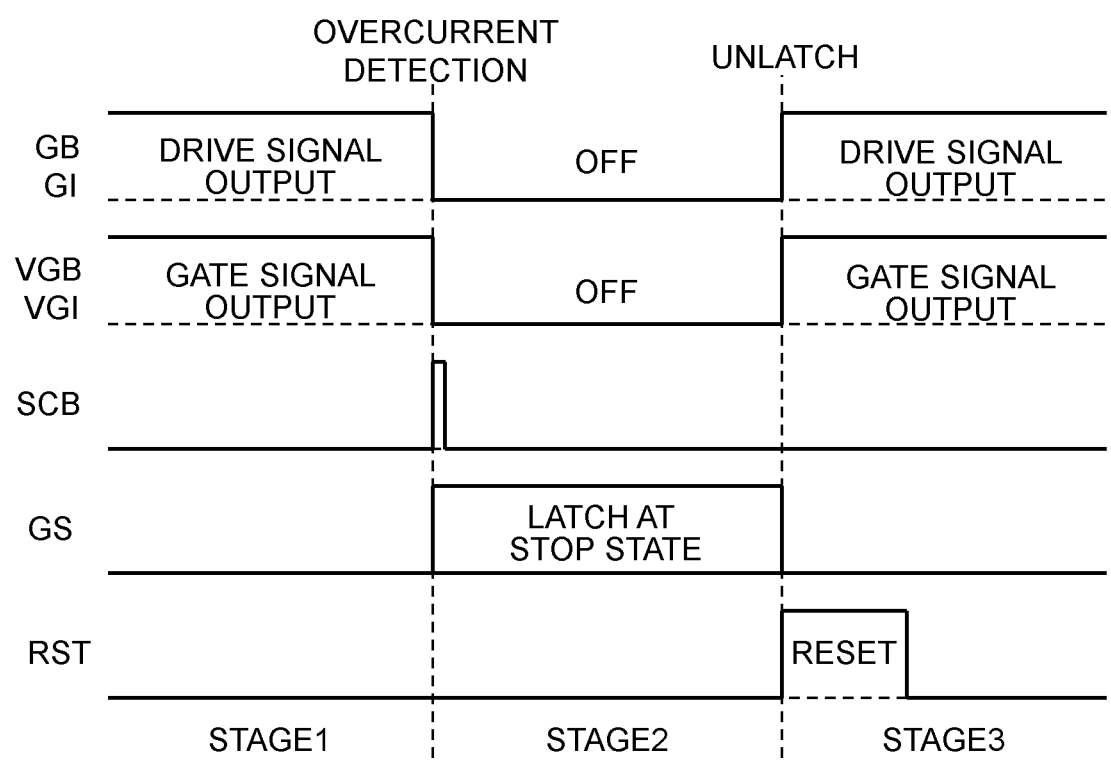
FIG. 2 is a figure illustrates an example of the operation of the power conversion device in the first embodiment.

FIG. 2 is used to illustrate an example of the operation of the power conversion device in the present embodiment. FIG. 2 shows drive signals GB, GI, gate signals VGB, VGI, overcurrent detection signal SCB, gate output cutoff signal GS, and reset signal RST, respectively, and shows the state of transition in Stage 1, Stage 2, and Stage 3 in the time direction.

In FIG. 2, at Stage 1, drive signals GB and GI are output from the control portion 231 to the regenerative braking drive portion 212 and the inverter drive portion 202, and the regenerative braking drive portion 212 and the inverter drive portion 202 receive drive signals GB and GI from the control portion 231 and output gate signals VGB and VGI to the regenerative braking portion 103 and the inverter portion 104, respectively.

When the regenerative braking overcurrent detection portion 211 detects an overcurrent while the regenerative braking portion 103 is operating, the regenerative braking overcurrent detection portion 211 outputs an overcurrent detection signal SCB (SCB: L→H) and shifts to Stage 2. The latch portion 221 receives the transition of the overcurrent detection signal SCB, outputs the gate output cutoff signal GS is output (GS: L→H) and latches the state. The regenerative braking drive portion 212 and the inverter drive portion 202 are configured to stop outputting the gate signals VGB and VGI while the gate output cutoff signal GS is in the H state. The control portion 231 is configured to stop outputting the drive signals GB and GI while the gate output cutoff signal GS is in the "H" state. By stopping the operation of the regenerative braking portion 103 and cutting off the current of the regenerative braking portion 103, the regenerative braking overcurrent detection portion 211 stops outputting the overcurrent detection signal SCB (SCB: H→L).

When it is confirmed that there is no operational problem such as failure due to overcurrent in the regenerative braking portion 103, the control portion 231 outputs the reset signal RST (RST: L→H), and shifts to Stage3. The latch portion 221 releases the latch of the gate output cutoff signal GS (GS: H→L) in response to the rise of the reset signal RST, and the control portion 231 outputs the drive signals GB and GI to the regenerative braking drive portion 212 and the inverter drive portion 202 in response to the fall of the gate output cutoff signal GS, and regenerative braking drive portion 212 and inverter drive portion 202 resume outputting the gate signals VGB and VGI.

It should be noted that the signals shown in FIG. 2 are only examples, and the logic is not limited. For example, in this embodiment, the operation of inputting a one-shot pulse to the reset signal RST and releasing the latch stop of the latch portion 221 at the rising edge has been described, but methods other than the illustrated method, such as releasing the latch at the falling edge, are also possible.

Figure 3:
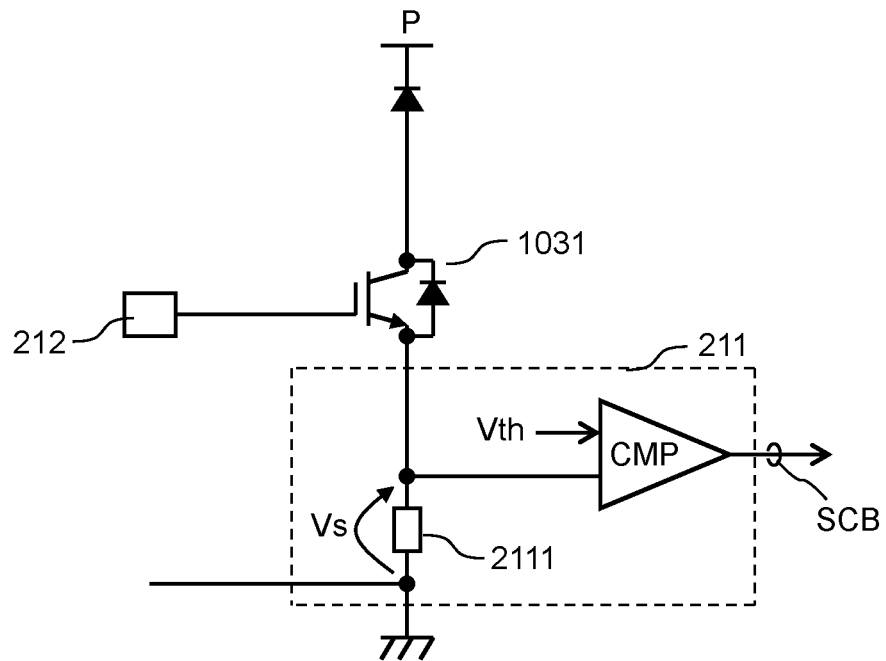
FIG. 3 is a configuration diagram showing a specific example of a regenerative braking overcurrent detection portion in the first embodiment.
Figure 4:
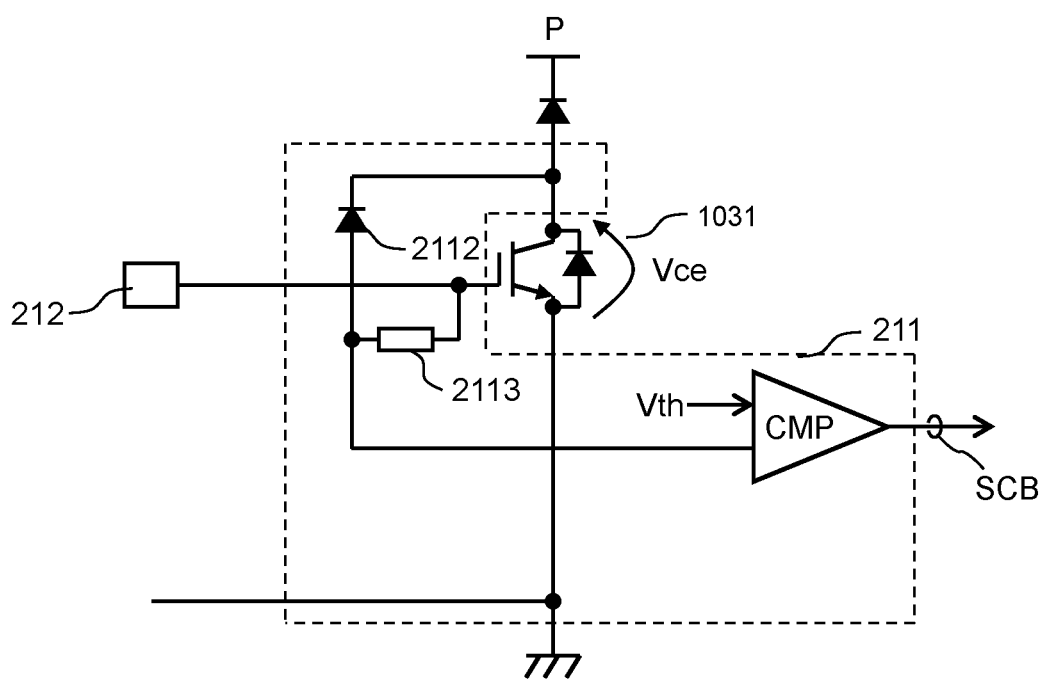
FIG. 4 is a configuration diagram showing a specific example of a regenerative braking overcurrent detection portion in the first embodiment.

FIG. 3 and FIG. 4 show specific examples of the regenerative braking overcurrent detection portion 211 in the present embodiment. FIG. 3 shows a method in which a current detection resistor 2111 is arranged on the emitter side of the switching element 1031 of the regenerative braking portion 103, and the comparator outputs the overcurrent detection signal SCB when the voltage (Vs) of the current detection resistor 2111 exceeds the threshold voltage Vth. FIG. 4 also shows a method in which a diode 2112 is connected to the collector terminal of the switching element 1031 of the regenerative braking portion 103, and detecting the emitter-collector voltage Vce in the ON state (VGB:H) of the switching element 1031 of the regenerative braking portion 103, and the comparator outputs the overcurrent detection signal SCB when Vce exceeds the threshold voltage Vth. These are commonly used methods, the former having the advantage of simple configuration and the latter having the advantage of low power loss.

Figure 5:
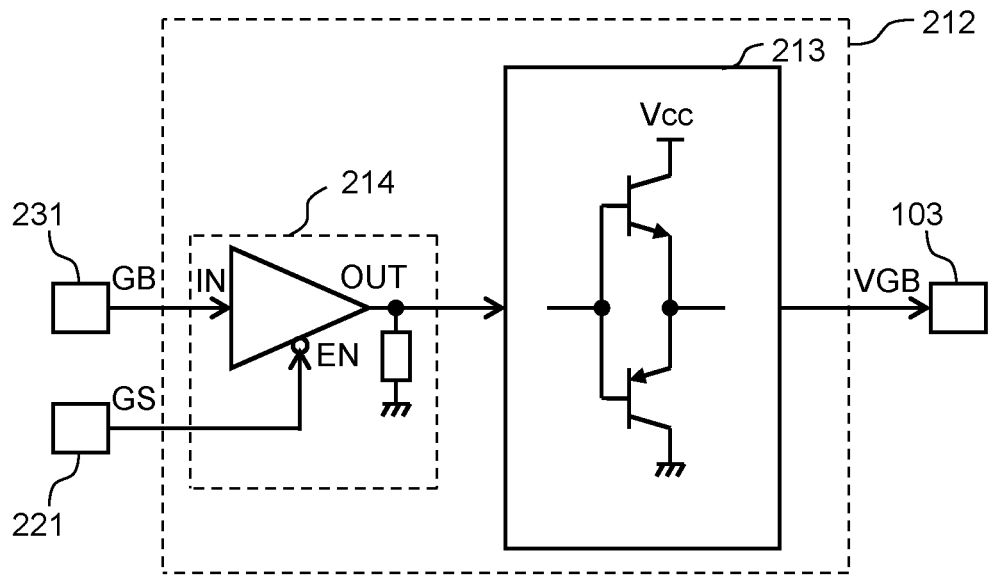
FIG. 5 is a configuration diagram showing a specific example of a regenerative braking drive portion in the first embodiment.
Figure 6:
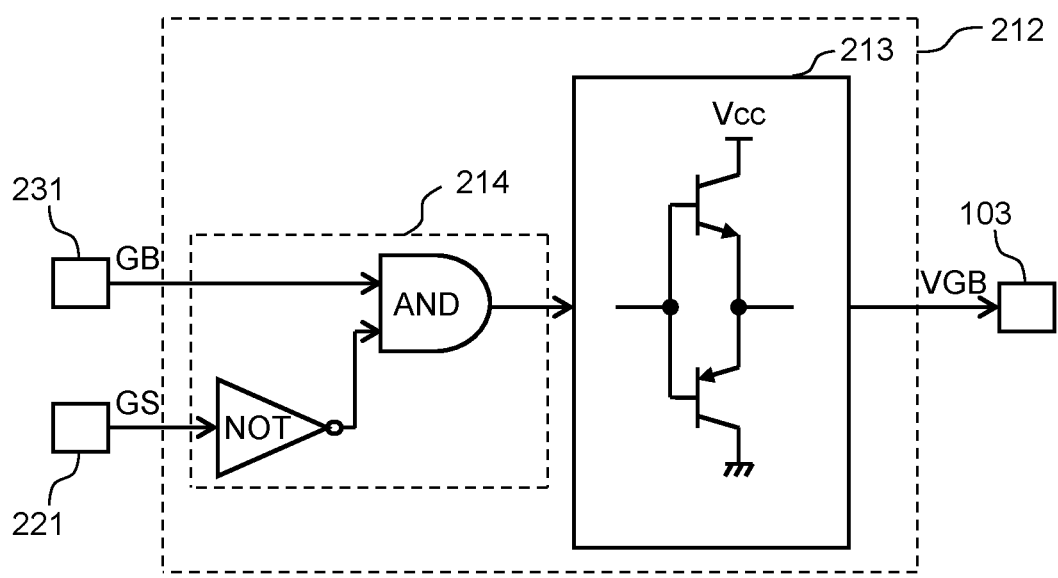
FIG. 6 is a configuration diagram showing a specific example of a regenerative braking drive portion in the first embodiment.

FIG. 5 and FIG. 6 show specific examples of the buffer portion 214 in the present embodiment. Although the configurations shown in FIG. 5 and FIG. 6 are examples and the logic thereof does not matter, the operation shown in FIG. 2 described above will be referred to in the present description. FIG. 5 shows a scheme in which a 3-state buffer is placed in buffer portion 214, and FIG. 6 shows a scheme in which an AND gate and a NOT gate are placed in buffer portion 214 as shown in the figure. In either method, when the gate output cutoff signal GS output from the latch portion 221 is in the H state, the output of the buffer portion 214 becomes L regardless of the drive signal GB, and a desired operation is realized by configuring the gate drive portion 213 so that the switching element of the regenerative braking portion 103 is turned off and stopped when the input is in the L state.

As described above, in the present embodiment, when the regenerative braking overcurrent detection portion 211 detects an overcurrent, the switching elements of the regenerative braking portion 103 and the inverter portion 104 are stopped in the off state. This prevents the breakdown of the switching elements of the regenerative braking portion 103 when an overcurrent occurs in the regenerative braking portion 103, and also the regenerative energy from the inverter portion 104 can be cut off to suppress the rise of the DC voltage.

In the present embodiment, two types of gate output cutoff by the buffer portion 214 and output stop of the driving signals GB and GI from the control portion 231 have been described. This is because it is assumed that even if one of them does not work due to a failure or malfunction, when the regenerative braking overcurrent detection portion 211 detects an overcurrent, the switching elements of the regenerative braking portion 103 and the inverter portion 104 are reliably stopped in the off state. Therefore, depending on the degree of protection of the power conversion device 1, only one of them may be used.

In addition, the regenerative braking overcurrent detection portion 211 can be connected at any point as long as it has the configuration shown in FIG. 3 and FIG. 4. For example, the circuit shown in FIG. 3 and FIG. 4 may be wired using external components, or a gate driver with some or all of the functions shown in FIG. 3 and FIG. 4 may be applied to the regenerative braking drive portion 212 may be applied. Here, if a gate driver that incorporates some or all of the functions shown in FIG. 3 and FIG. 4 is applied to the regenerative braking drive portion 212, the overcurrent detection signal SCB shown in FIG. 3 and FIG. 4 may exist inside the gate driver. In such a case, by replacing the overcurrent detection signal SCB with another signal synchronized with the overcurrent detection, such as an error signal output from the gate driver when the regenerative braking overcurrent detection portion 211 detects overcurrent, the same operation as described in the present embodiment can be achieved.

Moreover, the overcurrent detection signal SCB may be of a self-resetting type in which output is stopped after a predetermined time has passed since the regenerative braking overcurrent detection portion 211 detects overcurrent.

Further, if the switching elements of the regenerative braking portion 103 and the inverter portion 104 are stopped in the OFF state when the regenerative braking overcurrent detection portion 211 detects an overcurrent, the buffer portions 214 and 204 can be connected at any point. As an example, a gate driver that incorporates the function of the buffer portion 214 and cuts off the gate output when a control signal is input from the outside to a control terminal such as an enable terminal is applied to the regenerative braking drive portion 212 and the inverter drive portion 202, and the latch portion 221 may be input to the control terminal of the gate driver. In addition, a microcomputer that incorporates the function of the buffer portion 214 with functions such as output enable and can stop the output of the drive signal when the control signal is input to a predetermined terminal is applied to the control portion 231, and a control signal from the latch portion 221 may be input to the corresponding terminal of the control portion 231.

Thus, according to the present embodiment, when an overcurrent of the braking resistor is detected, the switching elements of the regenerative braking portion and the switching element of the inverter portion each stop in the off state, thus preventing damage to the braking resistor and the switching element of the regenerative braking portion while suppressing the rise in DC voltage and improving the reliability of the power conversion device.

Second Embodiment

Figure 7:
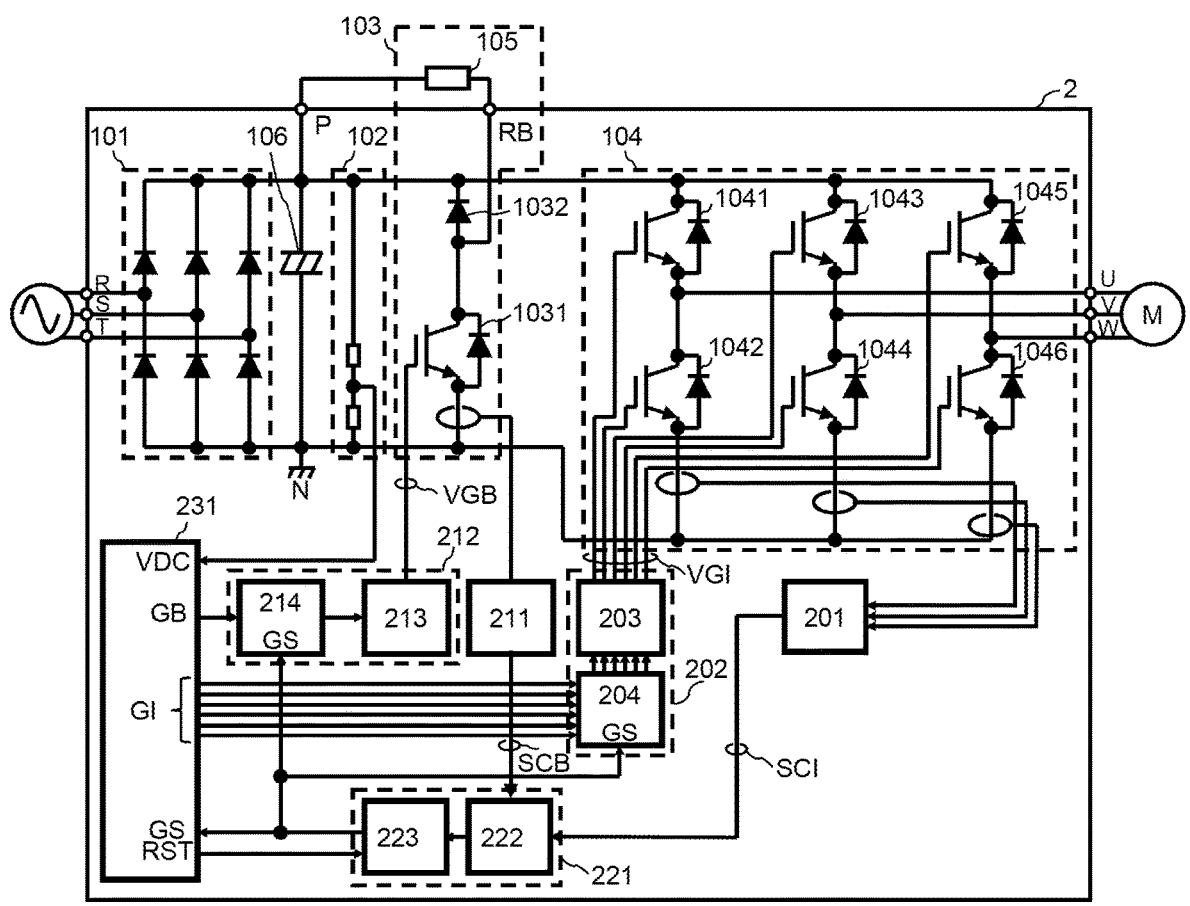
FIG. 7 is a configuration diagram of a power conversion device in a second embodiment.

FIG. 7 shows a configuration diagram of the power conversion device 2 in this embodiment. In FIG. 7, the same configuration as in FIG. 1 is marked with the same symbol and its explanation is omitted. In FIG. 7, the difference from FIG. 1 is the addition of an inverter overcurrent detection portion 201 that outputs an overcurrent detection signal SCI when the current flowing in the inverter portion 104 exceeds the judgment value. In addition, the latch portion 221 outputs a gate output cutoff signal GS to the control portion 231, the regenerative braking drive portion 212, and the inverter drive portion 202 when the regenerative braking overcurrent detection portion 211 or the inverter overcurrent detection portion 201 detects overcurrent.

In other words, when the current flowing in the inverter portion 104 exceeds a judgment value, the inverter overcurrent detection portion 201 outputs an overcurrent detection signal SCI to the latch portion 221. As in embodiment 1, the regenerative braking overcurrent detection portion 211 outputs an overcurrent detection signal SCB to the latch portion 221 when the current flowing in the regenerative braking portion 103 exceeds a judgment value.

When receiving the overcurrent detection signals SCB and SCI from the regenerative braking overcurrent detection portion 211 or the inverter overcurrent detection portion 201, the latch portion 221 outputs the gate output cutoff signal GS to the control input terminals of the buffer portions 214 and 204.

FIG. 8 shows a latch portion 221, a regenerative braking drive portion 212, and an inverter drive portion 202 in in the present embodiment. Note that the configuration shown in FIG. 8 is an example, and logic is not required. The buffer portion of the regenerative braking drive portion 212 and inverter drive portion 202 in FIG. 8 is a typical example of the buffer portion shown in FIG. 5. as a representative example.

In FIG. 8, the latch portion 221 consists of logic circuit 222, latch circuit 223. In the present embodiment, the operation is explained with logic circuit 222 as an OR gate. The regenerative braking overcurrent detection portion 211 and the inverter overcurrent detection portion 201 are configured to output L during normal operation and H during overcurrent operation, and the output of each overcurrent detection portion is input to the logic circuit 222. Therefore, the logic circuit 222 normally outputs L to the latch circuit 223, and outputs H to the latch circuit 223 when the regenerative braking overcurrent detection portion 211 or the inverter overcurrent detection portion 201 outputs H. The latch circuit 223 outputs the gate output cutoff signal GS to the regenerative braking drive portion 212, the inverter drive portion 202 and the control portion 231 when H is input from the logic circuit 222. In addition, the latch circuit 223 also releases the latch upon receiving the reset signal RST from the control portion 231, and restarts the driving of the regenerative braking portion 103 and the inverter portion 104 based on the driving signals GB and GI output from the control portion 231.

In FIG. 8, the inverter drive portion 202 consists of buffer portion 204 and gate drive portion 203. The buffer portion 204 consists of six buffer portions similar to the buffer portion 214 shown in FIG. 5, and the gate drive portion 203 also consists of six gate drive portions similar to the gate drive portion 213 shown in FIG. 5. Then, inverter driving portion 202 receives six driving signals GI output from the control portion 231 and outputs six gate signals VGI to the inverter portion 104.

Figure 9:
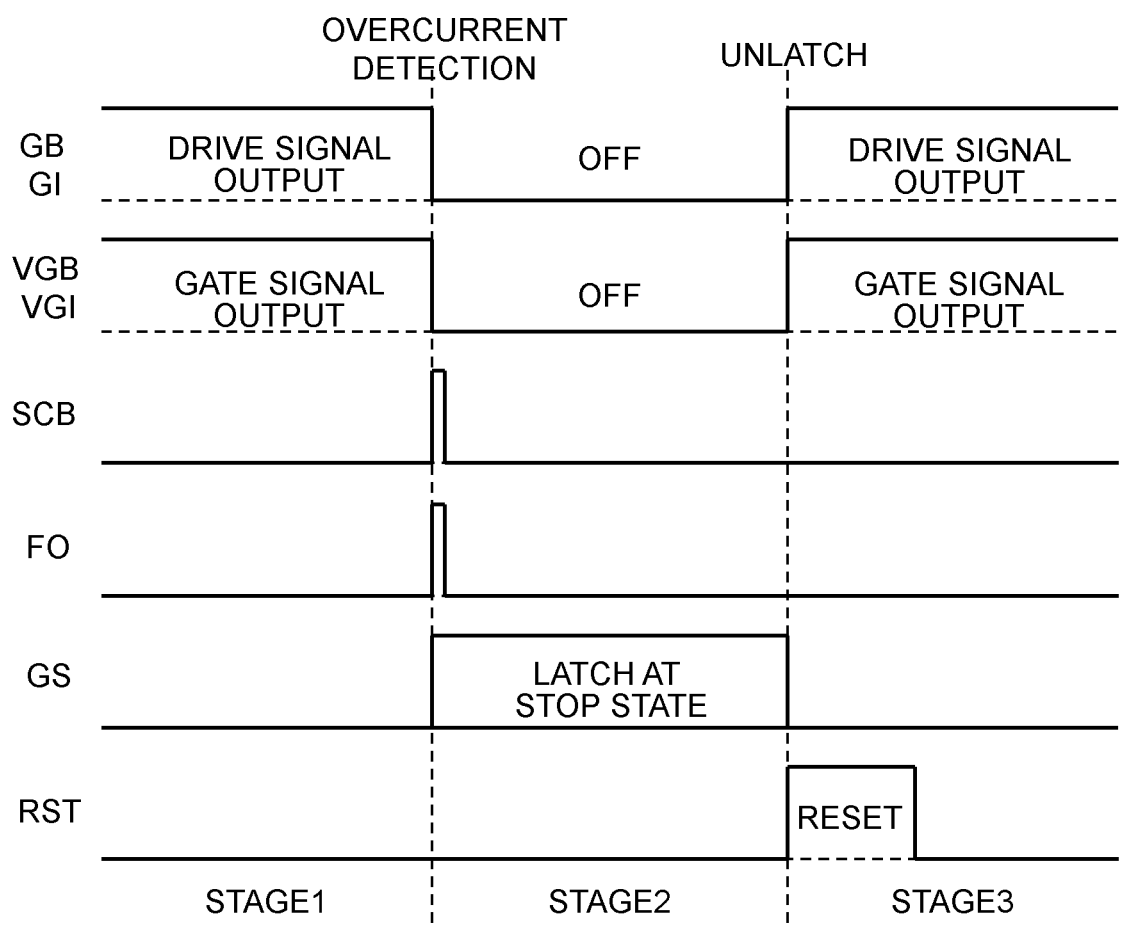
FIG. 9 is a figure illustrates an example of the operation of the power conversion device in the second embodiment.

FIG. 9 is used to explain the operation of the regenerative braking overcurrent detection portion 211 of the power conversion device in the present embodiment when an overcurrent is detected. FIG. 9 shows the drive signals GB, GI, gate signals VGB, and VGI, overcurrent detection signal SCB, logic circuit 222 output signal (FO), gate output cutoff signal GS, and reset signal RST, respectively, and showing how they change in Stage 1, Stage 2, and Stage 3 in the time direction. The signals shown in FIG. 9 are examples, and logic is not required.

In FIG. 9, at Stage 1, the drive signals GB and GI are output from the control portion 231 to the regenerative braking drive portion 212 and the inverter drive portion 202, and regenerative braking drive portion 212 and inverter drive portion 202 receive the drive signals GB and GI from the control portion 231 and output gate signals VGB and VGI to the regenerative braking portion 103 and the inverter portion 104, respectively.

When the regenerative braking overcurrent detection portion 211 detects an overcurrent, the regenerative braking overcurrent detection portion 211 outputs the overcurrent detection signal SCB (SCB: L→H), and shifts to Stage2. The Logic circuit 222 outputs H (FO: L→H) in response to the rise of the overcurrent detection signal SCB. The latch portion 221 outputs the gate output cutoff signal GS (GS: L→H) in response to the rise of the output signal of the logic circuit 222, and latches the state. The regenerative braking drive portion 212 and the inverter drive portion 202 are configured to stop outputting the gate signals VGB and VGI while the gate output cutoff signal GS is in the H state. Further, the control portion 231 is configured to stop outputting the drive signals GB and GI while the gate output cutoff signal GS is in the H state. By stopping the operation of the regenerative braking portion 103 and cutting off the current of the regenerative braking portion 103, the regenerative braking overcurrent detection portion 211 stops outputting the overcurrent detection signal SCB (SCB: H→L).

When it is confirmed that there is no operational problem such as a failure due to overcurrent in the regenerative braking portion 103, the control portion 231 outputs the reset signal RST (RST: L→H), and shifts to Stage3. The latch circuit 223 unlatches the gate output cutoff signal GS (GS: H→L) in response to the rise of the reset signal RST, and the control portion 231 outputs the drive signals GB and GI to the regenerative braking drive portion 212 and the inverter drive portion 202 in response to the fall of the gate output cutoff signal GS, and the regenerative braking drive portion 212 and the inverter drive portion 202 resume outputting the gate signals VGB and VGI.

In FIG. 9, the operation when the regenerative braking overcurrent detection portion 211 detects an overcurrent has been described, but when the inverter overcurrent detection portion 201 detects an overcurrent, the operation is performed by replacing the overcurrent detection signal SCB of FIG. 9 with SCI, and the switching elements of the regenerative braking portion 103 and the inverter portion 104 stop in the OFF state, similarly to the case where the regenerative braking overcurrent detection portion 211 detects overcurrent.

Figure 10:
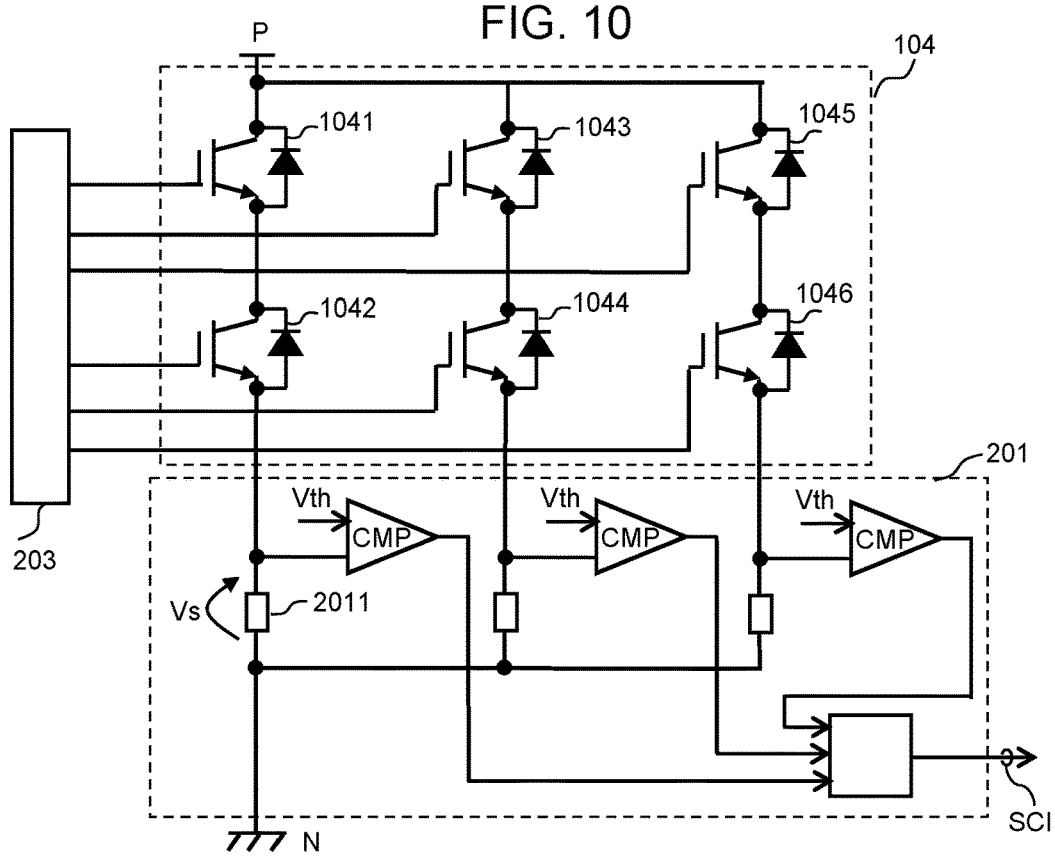
FIG. 10 is a configuration diagram showing a specific example of a inverter overcurrent detection portion in the second embodiment.
Figure 11:
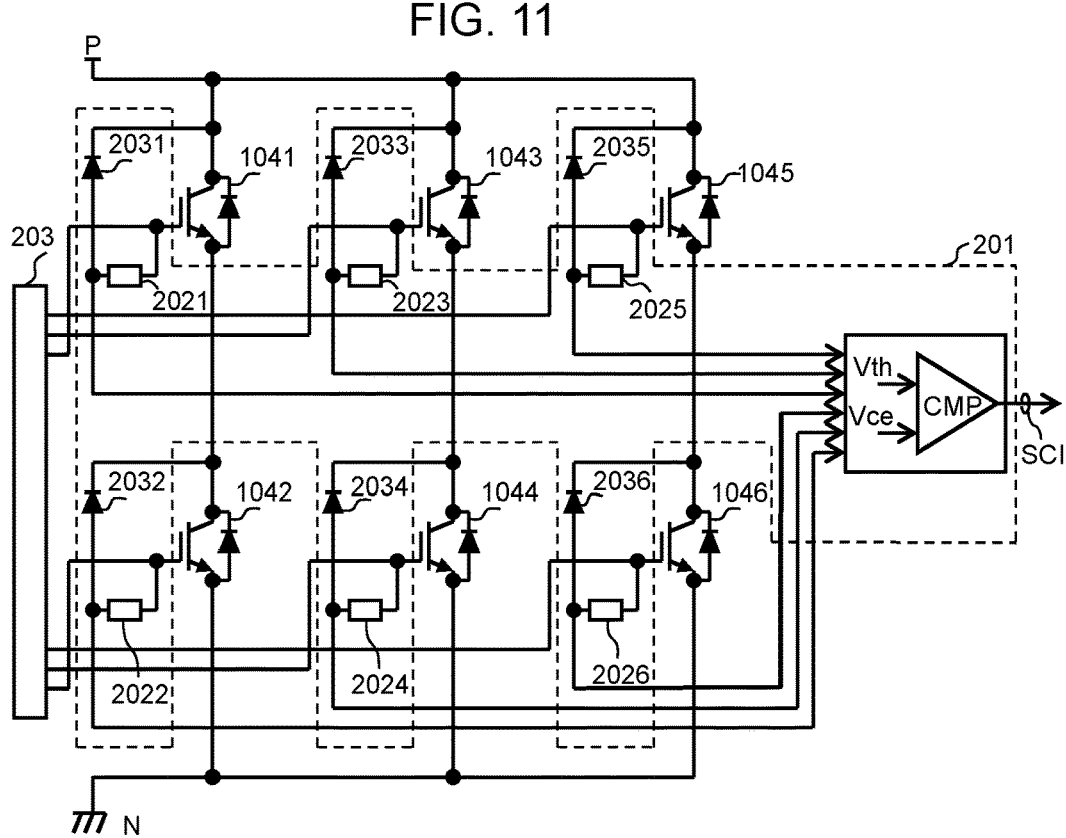
FIG. 11 is a configuration diagram showing a specific example of a inverter overcurrent detection portion in the second embodiment.

FIG. 10 and FIG. 11 show specific examples of the inverter overcurrent detection portion 201 in the present embodiment. FIG. 10 shows a scheme in which current detection resistors 2011, 2012, and 2013 are arranged on the emitter side of low-side switching elements 1042, 1044, and 1046 of the inverter portion 104, and when the voltage (Vs) of the current detection resistor exceeds the threshold voltage Vth, a comparator outputs the overcurrent detection signal SCI. FIG. 11 also shows a scheme in which diodes 2031 to 2036 are connected to the collector terminals of the switching elements 1041 to 1046 of the inverter portion 104, and resistors 2021 to 2026 are connected to the gate terminals of the switching elements 1041 to 1046 of the inverter portion 104, respectively as shown in figure, and the switching elements 1041 to 1046 of the inverter portion 104 detect the emitter-collector voltage Vce in an ON state, and the comparator outputs the overcurrent detection signal SCI when the Vce exceeds the threshold voltage Vth. These are commonly used methods, the former having a simple configuration and the latter having advantages of low power dissipation and overcurrent detection on the high-side.

As described above, in the present embodiment, an inverter overcurrent detection portion 201 is added to the first embodiment, and in addition to the operations described in the first embodiment, when the inverter overcurrent detection portion 201 outputs the overcurrent detection signal SCI, the switching of the regenerative braking portion 103 and the inverter portion 104 are stopped. Unexpected situations such as overcurrent due to incorrect wiring can occur not only in the regenerative braking portion 103 but also in the inverter portion 104. Therefore, for the same reason as that of the regenerative braking portion 103, it is desirable to provide an overcurrent detection portion also in the inverter portion 104 of the power conversion device 2. By sharing the configuration after the latch portion 221 described in the present embodiment between the regenerative braking portion 103 and the inverter portion 104, the number of parts is reduced compared to the case with a separate overcurrent protection system for the inverter portion 104 in the first embodiment.

In the present embodiment, an OR gate is used as a concrete example of the logic circuit 222, but the logic circuit 222 can be changed according to the logic output by the overcurrent detection portion. As an example, the OR gate is replaced by an AND gate, and the regenerative braking overcurrent detection portion 211 and inverter overcurrent detection portion 201 are made to output H during normal operation and L during overcurrent operation. As a result, the AND gate outputs H during normal operation, and when the regenerative braking overcurrent detection portion 211 or the inverter overcurrent detection portion 201 outputs L, it outputs L to the latch circuit 223. The latch circuit 223 outputs the gate output cutoff signal GS to the regenerative braking drive portion 212, inverter drive portion 202, and control portion 231 when L is input from the AND gate. This allows the gate output shutdown operation to be realized in the same way as the operation described in the present embodiment, when an overcurrent flows in the regenerative braking portion 103 or inverter portion 104.

The inverter overcurrent detection portion 201 can be connected at any point as long as it has the configuration shown in FIG. 10 and FIG. 11. For example, the circuit shown in FIG. 10 and FIG. 11 may be wired by external components, or a gate driver that incorporates some or all of the functions shown in FIG. 10 and FIG. 11 may be applied to the inverter drive portion 202. If the gate driver with some or all of the functions shown in FIG. 10 and FIG. 11 is applied to the inverter drive portion 202, the overcurrent detection signal SCI shown in FIG. 10 and FIG. 11 may be present inside the gate driver. In that case, by replacing another signal synchronized with the overcurrent detection, such as an error signal output from the gate driver when the inverter overcurrent detection portion 201 detects overcurrent, with the overcurrent detection signal SCI, an operation similar to that described in the present embodiment is realized.

Third Embodiment

Figure 12:
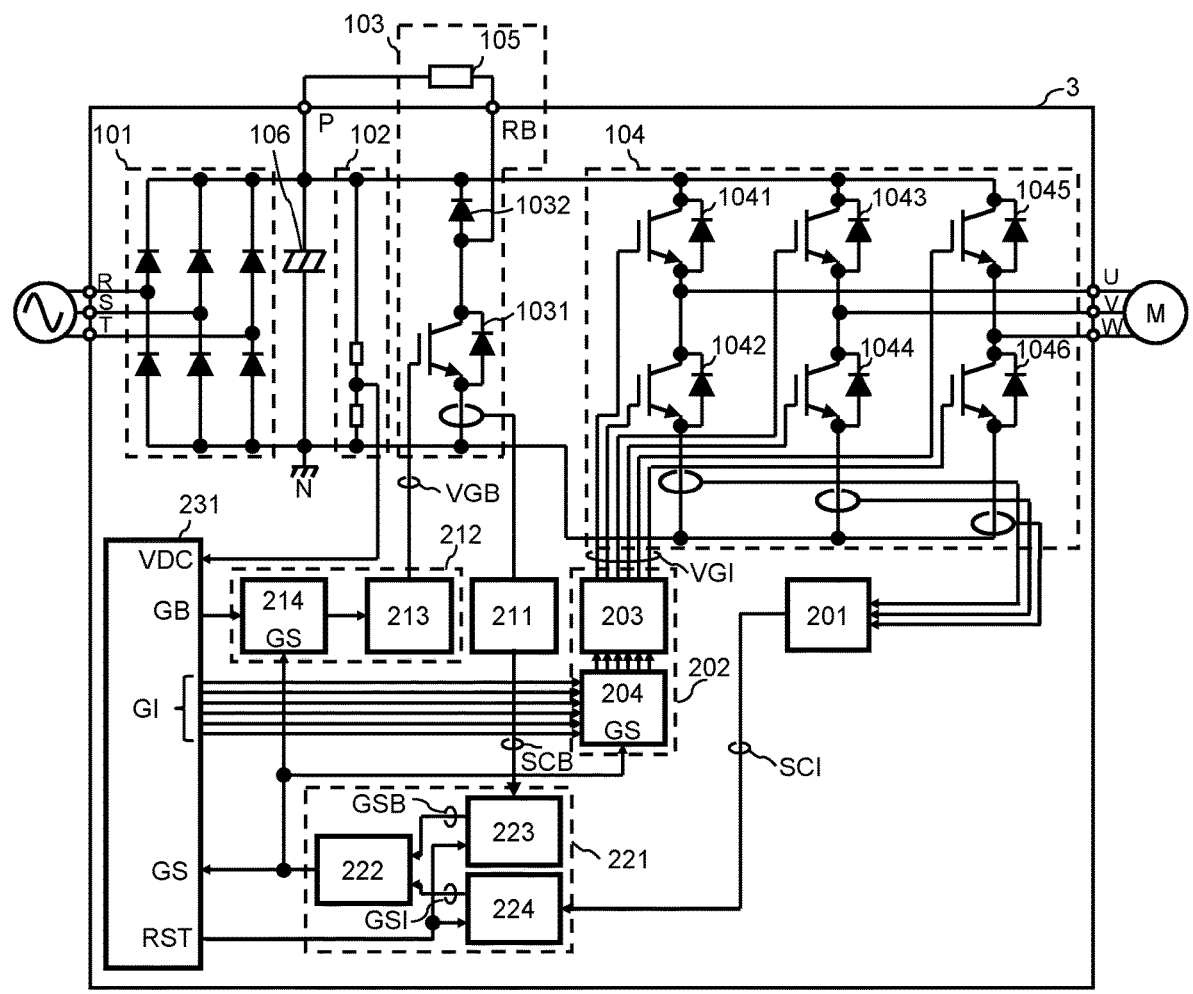
FIG. 12 is a configuration diagram of a power conversion device in a third embodiment.

FIG. 12 is a configuration diagram of the power conversion device 3 in this embodiment. In FIG. 12, the same configuration as in FIG. 7 is marked with the same symbol and its explanation is omitted. In FIG. 12, the difference from FIG. 7 is that the configuration of the latch portion 221 is changed, a latch circuit 224 is added in the latch portion 221, and the outputs of latch circuits 223 and 224 are input to the logic circuit 222.

In FIG. 12, the inverter overcurrent detection portion 201 outputs an overcurrent detection signal SCI to the latch circuit 224 when the current flowing in the inverter portion 104 exceeds the judgment value. When the latch circuit 224 receives the overcurrent detection signal SCI, it outputs the gate output cutoff signal GSI to the logic circuit 222. On the other hand, when the current flowing to the regenerative braking portion 103 exceeds the judgment value, the regenerative braking overcurrent detection portion 211 outputs the overcurrent detection signal SCB to the latch circuit 223 when the current flowing to the regenerative braking portion 103 exceeds the judgment value. When the latch circuit 223 receives the overcurrent detection signal SCB, it outputs the gate output cutoff signal GSB to the logic circuit 222. The logic circuit 222 outputs the gate output cutoff signal GS to the regenerative braking drive portion 212, the inverter drive portion 202, and the control portion 231 when the overcurrent detection signal SCB or SCI is input.

Figure 13:
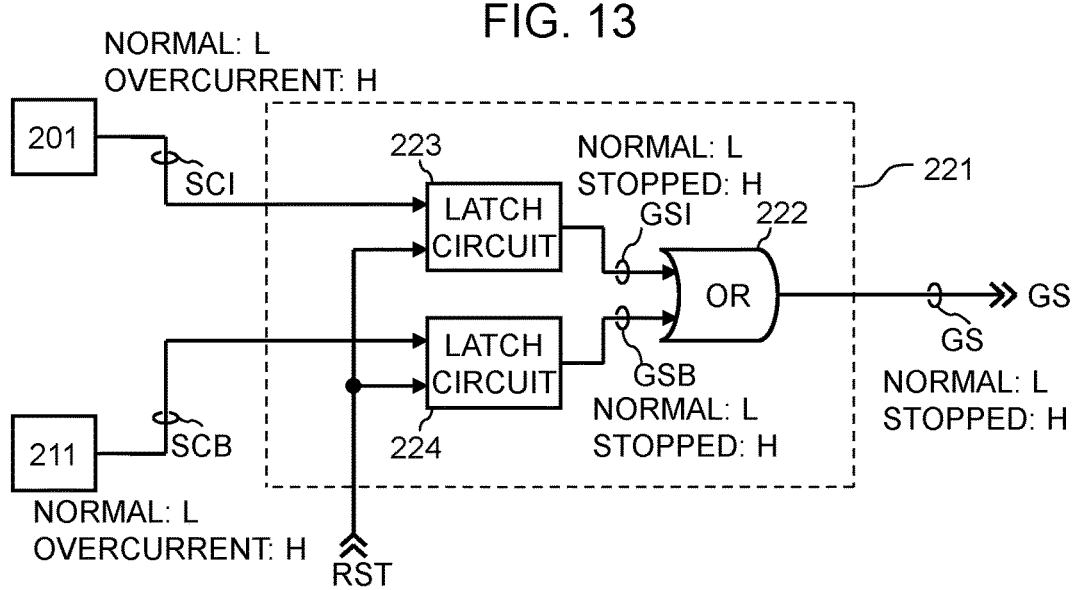
FIG. 13 is a configuration diagram showing a specific example of a latch portion in the third embodiment.

FIG. 13 shows a specific example of the latch portion 221 in the present embodiment. Note that the configuration shown in FIG. 13 is an example, and logic is not required.

In FIG. 13, the latch portion 221 consists of logic circuit 222, latch circuits 223 and 224. In the present embodiment, the operation is explained with logic circuit 222 as an OR gate. The regenerative braking overcurrent detection portion 211 and the inverter overcurrent detection portion 201 are configured to output L during normal operation and H during overcurrent operation, and the outputs of each overcurrent detection portion are input to latch circuits 223 and 224, respectively. The latch circuits 223 and 224 output the gate output cutoff signals GSB and GSI to the logic circuit 222 when H is input from regenerative braking overcurrent detection portion 211 and inverter overcurrent detection portion 201. The logic circuit 222 outputs the gate output cutoff signal GS to the regenerative braking drive portion 212, inverter drive portion 202, and control portion 231 when the gate output cutoff signals GSB or GSI is output. The latch circuits 223 and 224 release the latch by receiving the reset signal RST from the control portion 231, and resume driving the regenerative braking portion 103 and the inverter portion 104 based on the driving signals GB and GI output from the control portion 231.

Figure 14:
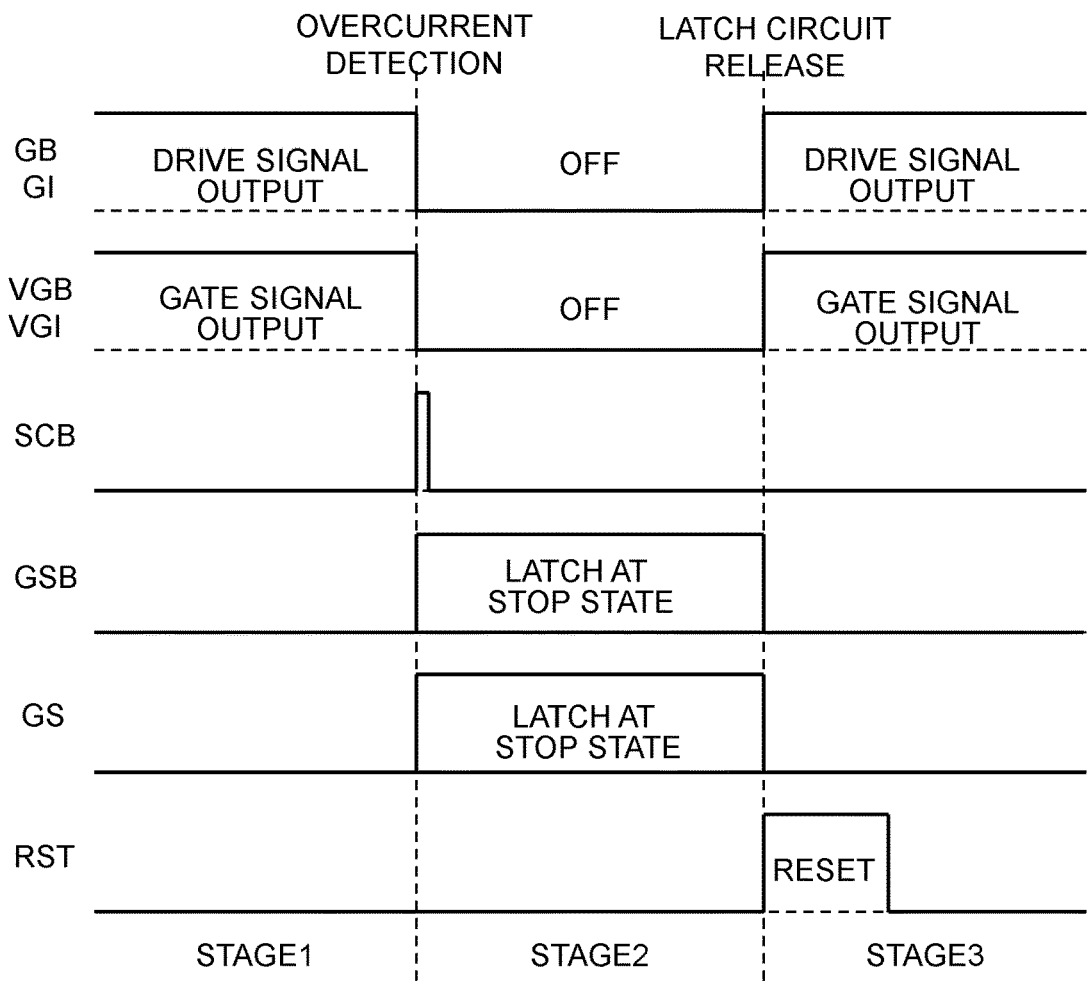
FIG. 14 is a figure illustrates an example of the operation of the power conversion device in the third embodiment.

FIG. 14 is used to explain the operation of the regenerative braking overcurrent detection portion 211 of the power conversion device 3 in the present embodiment when an overcurrent is detected. FIG. 14 shows the drive signals GB, GI, gate signals VGB, VGI, overcurrent detection signal SCB, gate output cutoff signals GSB, GS, and reset signal RST, respectively, and showing how they change in Stage 1, Stage 2, and Stage 3 in the time direction. The signals shown in FIG. 14 are examples, and logic is not required.

In FIG. 14, at Stage 1, the control portion 231 outputs drive signals GB and GI to the regenerative braking drive portion 212 and inverter drive portion 202, and regenerative braking drive portion 212 and inverter drive portion 202 receive drive signals GB and GI from the control portion 231, and output gate signals VGB and VGI to the regenerative braking drive portion 103 and the inverter drive portion 104, respectively.

When the regenerative braking overcurrent detection portion 211 detects an overcurrent, the regenerative braking overcurrent detection portion 211 outputs the overcurrent detection signal SCB (SCB: L→H), and shifts to Stage 2. The latch circuit 223 outputs H (GSB: L→H) in response to the rise of the overcurrent detection signal SCB, and latches the state. Logic circuit 222 outputs H (GS: L→H) in response to the rise of the overcurrent detection signal SCB. The regenerative braking drive portion 212 and the inverter drive portion 202 are configured to stop outputting the gate signals VGB and VGI while the gate output cutoff signal GS is in the H state. The control portion 231 is configured to stop outputting the drive signals GB and GI while the gate output cutoff signal GS is in the H state. By stopping the operation of the regenerative braking portion 103 and cutting off the current of the regenerative braking portion 103, the regenerative braking overcurrent detection portion 211 stops outputting the overcurrent detection signal SCB (SCB: H→L).

When it is confirmed that there is no operational problem such as a failure due to overcurrent in the regenerative braking portion 103, the control portion 231 outputs the reset signal RST (RST: L→H) and shifts to Stage 3. The latch circuit 223 releases the latch of the gate output cutoff signal GSB (GSB: H→L) in response to the rise of the reset signal RST, and the logic circuit 222 outputs L (GS: H→L) in response to the fall of the gate output cutoff signal GSB. The control portion 231 outputs the drive signals GB and GI to the regenerative braking drive portion 212 and the inverter drive portion 202 in response to the fall of the gate output cutoff signal GS, and the regenerative braking drive portion 212 and inverter drive portion 202 resume outputting the gate signals VGB and VGI.

In FIG. 14, the operation when the regenerative braking overcurrent detection portion 211 detects an overcurrent has been described, but when the inverter overcurrent detection portion 201 detects an overcurrent, the operation is performed by replacing the overcurrent detection signal SCB and the gate output cutoff signal GSB of FIG. 14 with SCI and GSI, respectively, and the switching elements of the regenerative braking portion 103 and the inverter portion 104 stop in the OFF state, similarly to the case where the regenerative braking overcurrent detection portion 211 detects overcurrent.

As described above, in the present embodiment, the latch circuit 224 is added to the second embodiment, and the outputs of latch circuits 223 and 224 are input to logic circuit 222, and the gate output cutoff signal GS is input from logic circuit 222 to control portion 231, regenerative braking drive portion 212, and inverter drive portion 202. The power conversion device 3 described in the present embodiment is a variant of the power conversion device 2 described in the second embodiment. In both cases, in order to realize the operation of stopping the switching elements of the regenerative braking portion 103 and the inverter portion 104 in the OFF state when overcurrent is detected, it is possible to change it as necessary in consideration of the mounting area, part cost, and the like.

Here, in the configuration shown in FIG. 12, the latch circuit 224 can be connected at any point. For example, the latch circuit 224 may be wired by an external component, or a gate driver with a built-in latch function for overcurrent protection may be applied to the inverter drive portion 202.

If a gate driver with a built-in latch function for overcurrent protection is applied to the inverter drive portion 202, the overcurrent detection signal SCI shown in FIG. 12 may be present inside the gate driver. In such a case, by replacing another signal synchronized with the overcurrent detection, such as an error signal output from the gate driver when the inverter overcurrent detection portion 201 detects overcurrent, with the overcurrent detection signal SCI, alternatively, by outputting the overcurrent detection signal SCI directly from the gate driver, an operation similar to that described in the present embodiment is realized.

Fourth Embodiment

Figure 15:
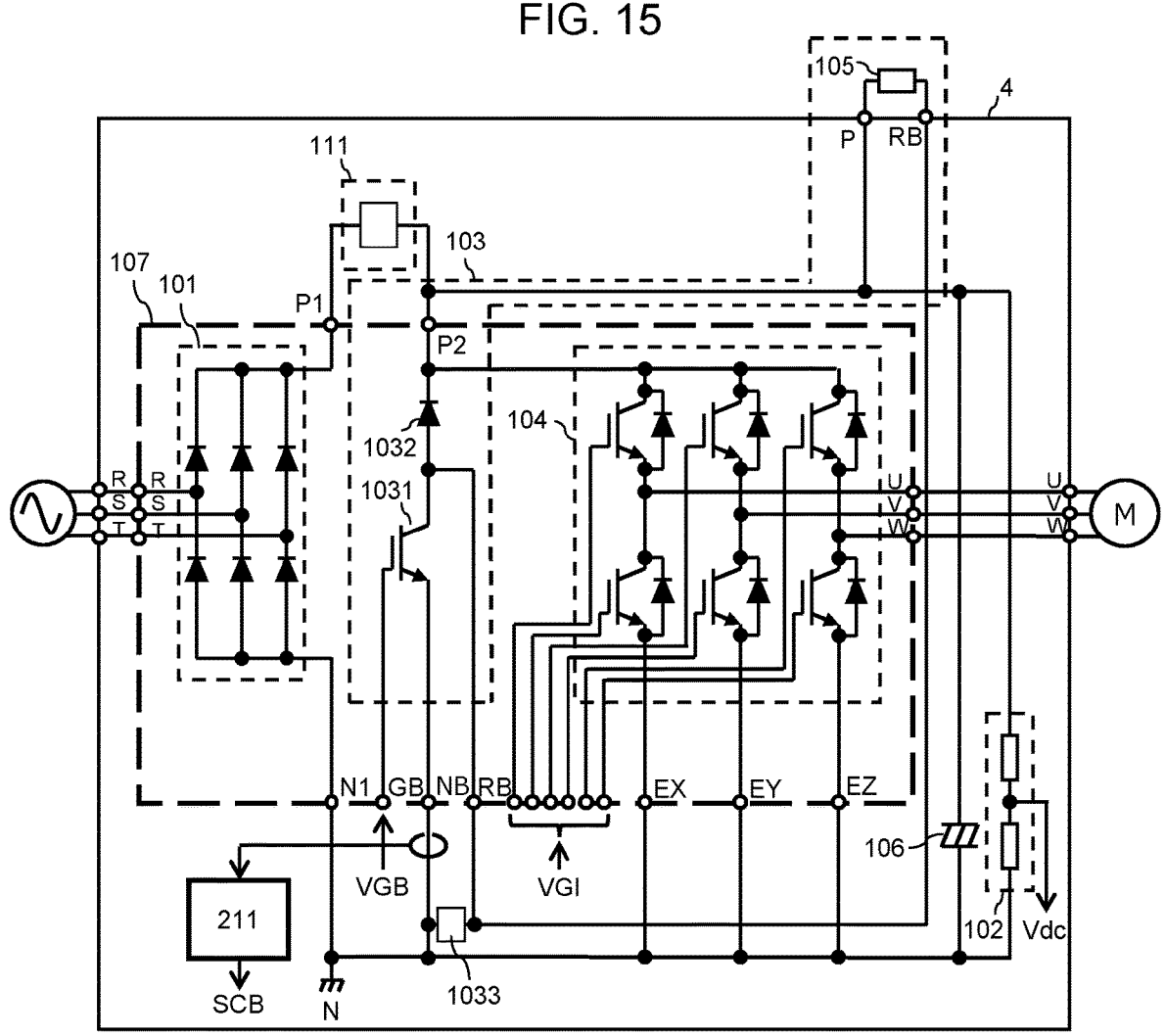
FIG. 15 is a configuration diagram of a power conversion device in a fourth embodiment.
Figure 16:
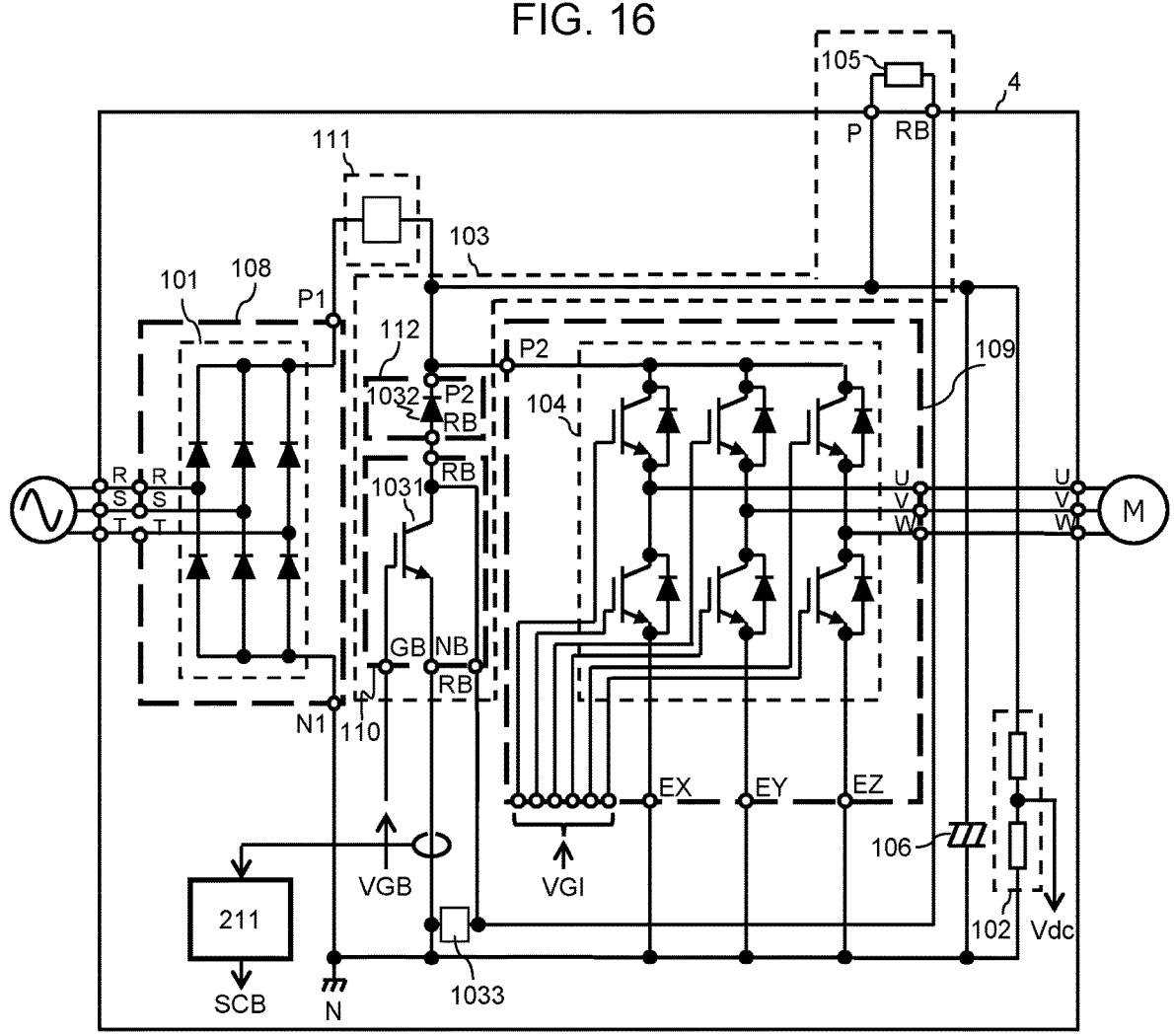
FIG. 16 is a configuration diagram of a power conversion device in the fourth embodiment.

FIG. 15 and FIG. 16 show the configuration of the power conversion device 4 in the present embodiment. In the present embodiment, a configuration example is described for the power conversion portion of the power conversion device described in FIG. 1, FIG. 7, FIG. 12, etc.

As shown in FIG. 15, in the power conversion device 4 of the present embodiment, the rectifying portion 101, the switching element 1031 and the diode 1032 constituting the regenerative braking portion 103, and the inverter portion 104 are arranged inside the semiconductor module 107 which is the same package. This form of semiconductor module is generally called a PIM (Power Integrated Module).

The configuration shown in FIG. 16 is different from that shown in FIG. 15 in that the rectifying portion 101 is configured by the semiconductor module 108, the inverter portion 104 is configured by the semiconductor module 109, and the switching element 1031 and diode 1032 constituting the regenerative braking portion 103 are composed of discrete elements 110 and 112, respectively.

Hereafter, the present embodiment is described using FIG. as a representative example. An AC voltage input from an AC power supply is input to the R terminal, S terminal, and T terminal of the semiconductor module 107 and is rectified into a DC voltage by the rectifying portion 101 arranged inside the semiconductor module 107. The high voltage side of the DC voltage is output from the P1 terminal of the semiconductor module 107 to the outside of the semiconductor module 107 and is input to the inrush current limiting portion 111. The inrush current limiting portion 111 prevents the charging current to the smoothing capacitor 106 from becoming excessive when the AC power is turned on, etc.

The DC voltage output from the inrush current limiting portion 111 is input to the P2 terminal of the semiconductor module 107, and AC power is output from the U terminal, V terminal, and W terminal by switching of the inverter portion 104.

As mentioned earlier, the need to connect the braking resistor 105 is determined by the braking torque of the inverter portion 104 and the moment of inertia of the motor. Here, when the braking resistor 105 is not connected and the switching element 1031 is off, the collector terminal (RB terminal in FIG. 15) of the switching element 1031 is connected to node N with the resistance of the off state of the switching element 1031. The off state resistance of the switching element 1031 is a high impedance value on the order of MS), and if power is supplied from the AC power supply to the motor in this state, there is a concern that electromagnetic noise generated in the inverter portion 104 may cause the regenerative braking overcurrent detection portion 211 to malfunction and output the regenerative braking overcurrent detection signal SCB.

Therefore, current path 1033 is placed between the RB terminal and node N. Due to the effect of arranging the current path 1033, electromagnetic noise generated from the inverter portion 104 flows to the node N through the current path 1033 even when the switching element 1031 is in the OFF state, so that the potential of the RB terminal is stabilized and noise resistance is improved.

Figure 17:
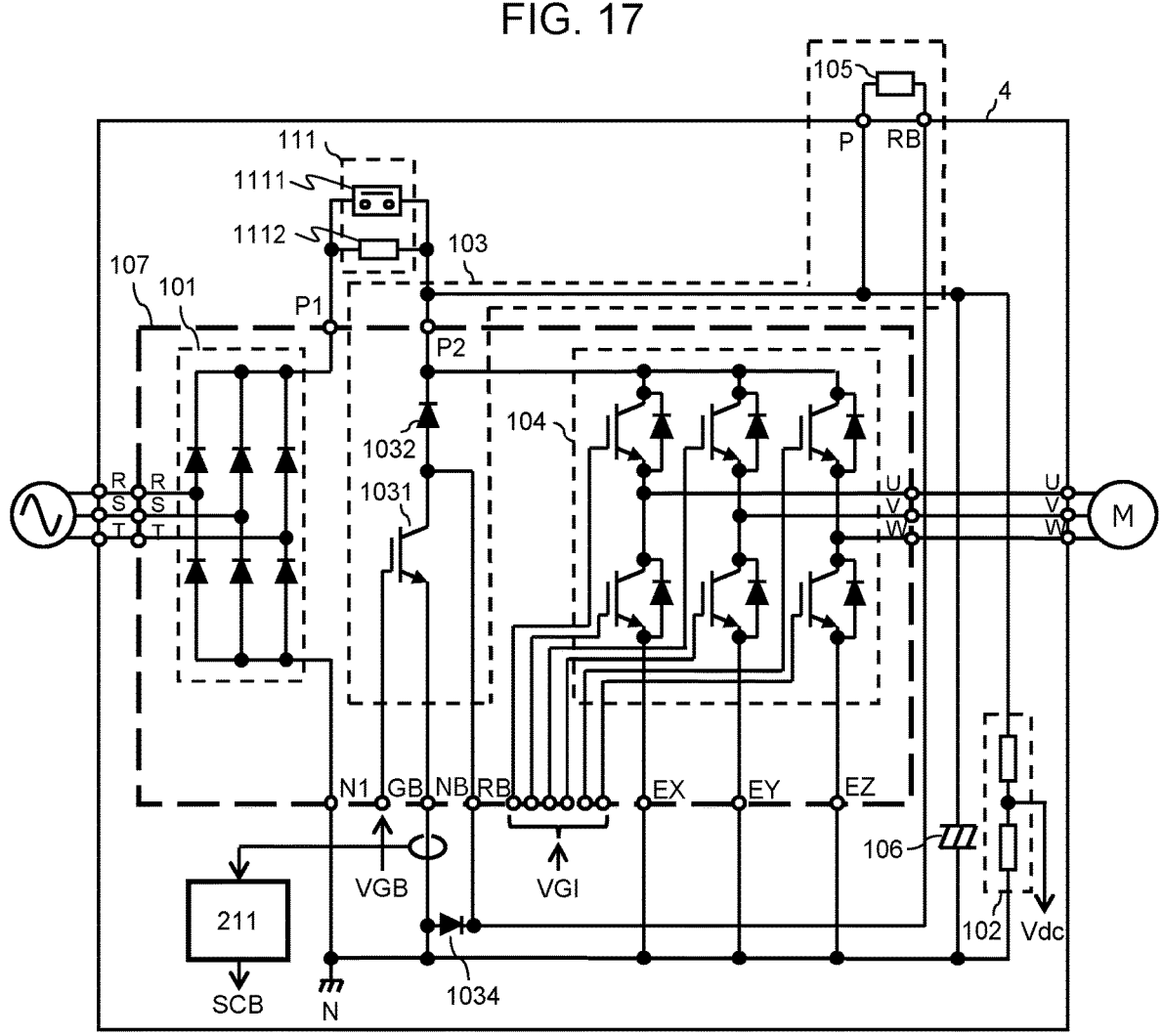
FIG. 17 is a configuration diagram showing specific examples of the inrush current limiting portion and current path in the fourth embodiment.

FIG. 17 shows an example of the inrush current limiting portion 111 and the current path 1033. The inrush current limiting portion 111 consists of a relay 1111 and a current limiting resistor 1112. Under conditions where voltage is generated at both ends of inrush current limiting portion 111, such as when AC power is turned on, relay 1111 is turned off and current flows through the current limiting resistor 1112. When the smoothing capacitor 106 is charged and the DC voltage becomes higher than a predetermined value, relay 1111 turns on. The inrush current limiting portion 111 can also be configured with thyristors or other components.

The current path 1033 arranges a diode 1034 in a direction in which the anode is connected to the node N of the switching element 1031 and the cathode is connected to the RB terminal. By adding the diode 1034 in the direction shown, even when the switching element 1031 is in the OFF state, the RB terminal is connected to the NB terminal or node N by the off resistance between the anode and cathode of diode 1034. Therefore, the potential of the RB terminal is stabilized compared to the case where the current path 1033 is not connected.

Figure 18:
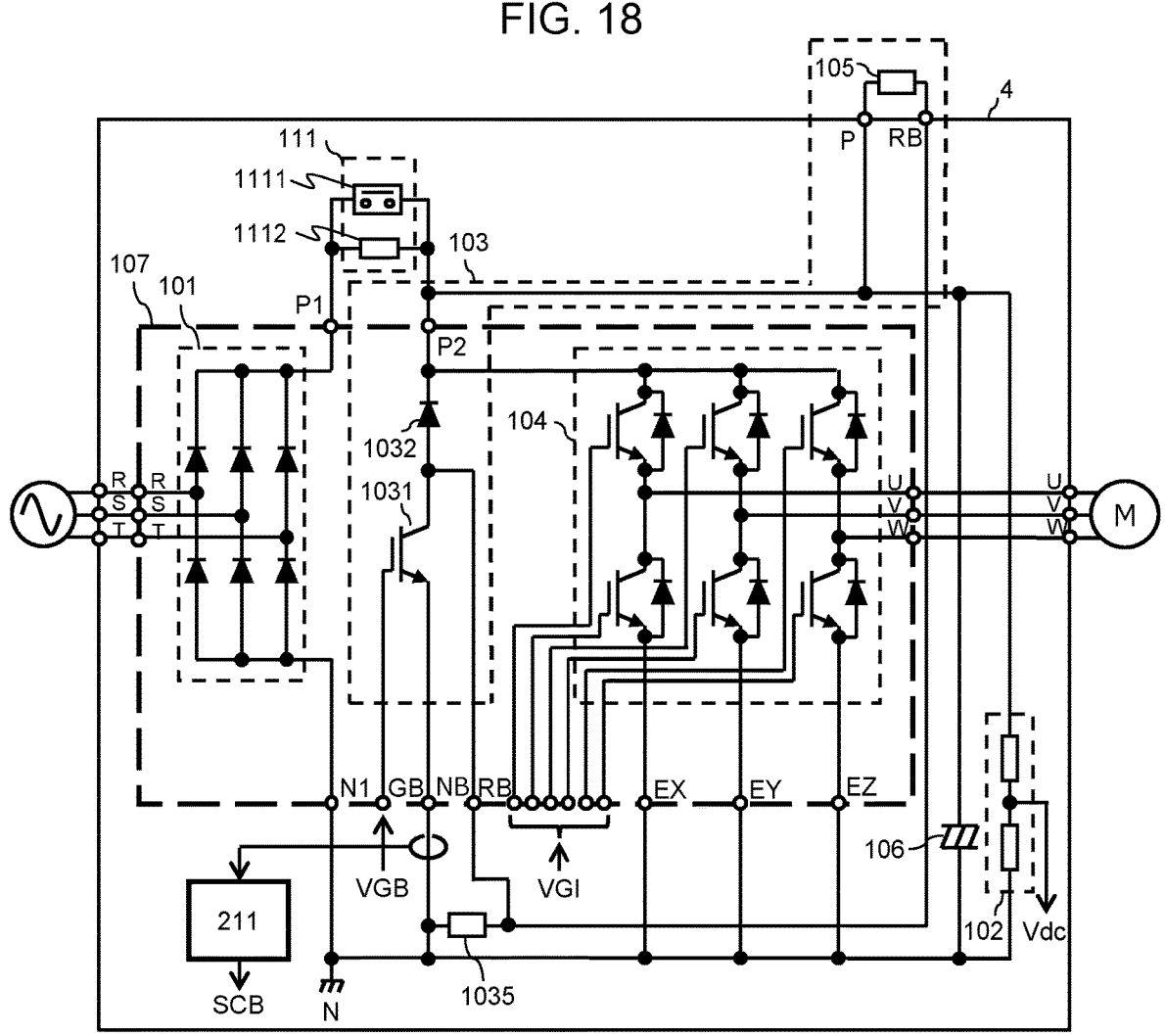
FIG. 18 is a configuration diagram showing specific examples of the inrush current limiting portion and current path in the fourth embodiment.

In FIG. 18, unlike FIG. 17, the current path 1033 has a resistor 1035 between the node N and the RB terminal. As a result, similar to FIG. 17, even when the switching element 1031 is in the OFF state, the RB terminal is connected to the node N by the resistance value of the resistor 1035, so the potential of the RB terminal is stabilized compared to the case where the current path 1033 is not connected.

Figure 19:
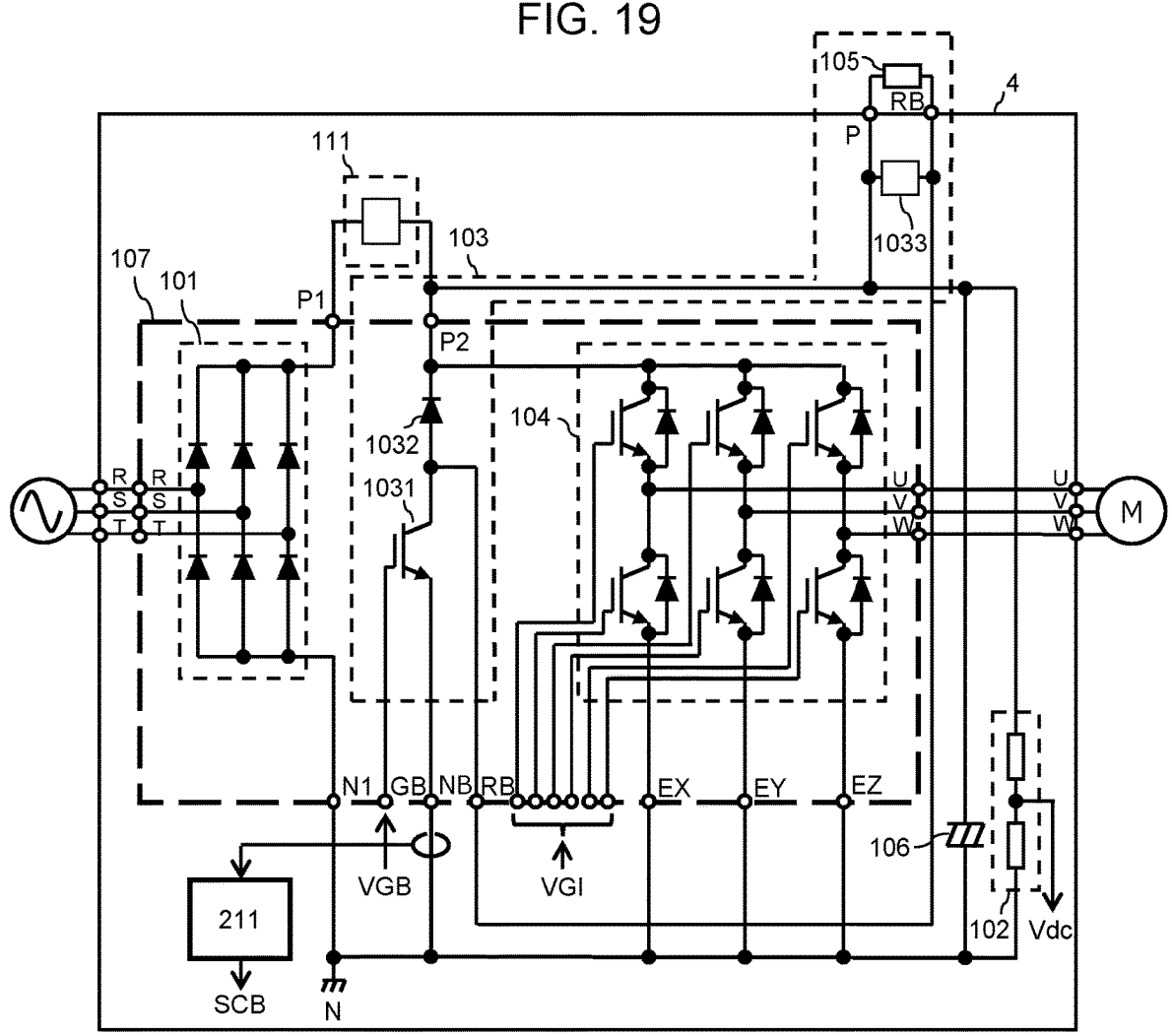
FIG. 19 is a configuration diagram of a power conversion device in the fourth embodiment.

FIG. 19 differs from FIG. 15 in that the current path 1033 is placed between node P and the RB terminal, and electromagnetic noise generated from the inverter portion 104 is channeled to node P to improve the noise immunity of the regenerative braking overcurrent detection portion 211. The current path 1033 can be configured with a diode or resistor as in the fourth embodiment.

For the current path 1033, a lower resistance value improves noise immunity, but also increases losses. In order to provide the minimum noise immunity, it is desirable to select the resistance value of the current path 1033 to be lower than the resistance value of the switching element 1031 in the OFF state in order not to flow the electromagnetic noise generated from the inverter portion 104 to the switching element 1031.

The above embodiments are described in detail in order to explain the invention in an easy-to-understand manner, and are not necessarily limited to those having all the described configurations. It is also possible to replace portion of the configuration of one embodiment with the configuration of another embodiment, and it is also possible to add the configuration of another embodiment to the configuration of one embodiment. It is also possible to add, delete, or replace some of the configurations of each embodiment with other configurations.

REFERENCE SIGNS LIST 1, 2, 3, 4 Power conversion device
101 Rectifying portion
102 Voltage detection portion
103 Regenerative braking portion
1031, 1041 to 1046 Switching element
1032, 1034, 2112, 2031 to 2036 Diode
1033 Current path
1035, 2021 to 2026, 2113 Resistor
104 Inverter portion
105 Braking resistor
106 Smoothing capacitor
107, 108, 109 Semiconductor module
110, 112 Discrete element
111 Inrush current limiting portion
1111 Relay
1112 Current limiting resistor
201 Inverter overcurrent detection portion
2011 to 2013, 2111 Current sensing resistor
202 Inverter drive portion
203, 213 Gate drive portion
204, 214 Buffer portion
211 Regenerative braking overcurrent detection portion
212 Regenerative braking drive portion
221 Latch portion
222 Logic circuit
223, 224 Latch circuit
231 Control portion

The invention claimed is:

1. A power conversion device that inputs AC voltage and outputs AC power, the device comprising:
a rectifying portion for rectifying an AC voltage and outputting a DC voltage;
a smoothing capacitor for smoothing the DC voltage;
an inverter portion into which the DC voltage is input and which outputs AC power;

an inverter drive portion for outputting a gate signal to the inverter portion;

a regenerative braking portion connected in parallel with the smoothing capacitor;

a regenerative braking drive portion for outputting a gate signal to the regenerative braking portion;

a control portion for outputting drive signals to the inverter drive portion and the regenerative braking drive portion;

a regenerative braking overcurrent detecting portion for outputting an overcurrent detection signal if the current flowing through the regenerative braking portion exceeds a determination value; and a latch portion into which the overcurrent detection signal output from the regenerative braking overcurrent detecting portion is input and which outputs a gate output interruption signal to the control portion, wherein switching elements of the inverter portion and the regenerative braking portion stop in an off state when the regenerative braking overcurrent detection portion detects an overcurrent.

2. The power conversion device according to claim 1, wherein the regenerative braking drive portion includes a regenerative braking buffer portion that inputs a drive signal from the control portion, and a regenerative braking gate drive portion that outputs a gate signal to the regenerative braking portion.

3. The power conversion device according to claim 2, wherein when the regenerative braking overcurrent detection portion detects an overcurrent, the latch portion outputs a gate output cutoff signal to the regenerative braking buffer portion so that the gate signal output from the regenerative braking drive portion stops the switching elements of the regenerative braking portion in the off state.

4. The power conversion device according to claim 1, further comprising:

an inverter overcurrent detection portion that outputs an overcurrent detection signal when the current flowing through the inverter portion exceeds a judgment value, wherein the latch portion inputs the overcurrent detection signal output from the regenerative braking overcurrent detection portion and the inverter overcurrent detection portion, and outputs the gate output cutoff signal to the control portion.

5. The power conversion device according to claim 4, wherein the regenerative braking drive portion includes a regenerative braking buffer portion that inputs a drive signal from the control portion, and a regenerative braking gate drive portion that outputs a gate signal to the regenerative braking portion, and the inverter drive portion includes an inverter buffer portion that inputs drive signal from the control portion, and an inverter gate drive portion that outputs gate signal to the inverter portion.

6. The power conversion device according to claim 5, wherein when the regenerative braking overcurrent detection portion or the inverter overcurrent detection portion detects an overcurrent, the latch portion outputs a gate output cutoff signal to the regenerative braking buffer portion and the inverter buffer portion so that the gate signal output from the regenerative braking drive portion and the inverter drive portion stop the switching elements of the regenerative braking portion and the inverter drive portion in the off state.

7. The power conversion device according to claim 4, wherein the latch portion consists of a logic circuit and a latch circuit.

8. The power conversion device according to claim 7, wherein the logic circuit inputs the overcurrent detection signals output from the regenerative braking overcurrent detection portion and the inverter overcurrent detection portion, and outputs the overcurrent detection signal when the regenerative braking overcurrent detection portion or the inverter overcurrent detection portion detects an overcurrent, and when the overcurrent detection signal output from the logic circuit is input, the latch circuit outputs the gate output cutoff signal so that the gate signal output from the regenerative braking drive portion and the inverter drive portion stop the switching elements of the regenerative braking portion and the inverter portion in the off state.

9. The power conversion device according to claim 7, wherein the latch circuit inputs the overcurrent detection signals output from the regenerative braking overcurrent detection portion and the inverter overcurrent detection portion, and outputs the gate output cutoff signal when the regenerative braking overcurrent detection portion or the inverter overcurrent detection portion detects an overcurrent, and when the gate output cutoff signal output from the latch circuit is input, the logic circuit outputs the gate output cutoff signal so that the gate signal output from the regenerative braking drive portion and the inverter drive portion stop the switching elements of the regenerative braking portion and the inverter portion in the off state.

10. The power conversion device according to claim 1, wherein the latch portion includes a flip-flop circuit and releases the latch stop state by receiving a reset signal output from the control portion.

11. The power conversion device according to claim 1, wherein the overcurrent detection signal stops outputting after a predetermined time elapses after the regenerative braking overcurrent detection portion detects the overcurrent.

12. A power conversion device that inputs AC voltage and outputs AC power, the device comprising:

a rectifying portion for rectifying an AC voltage and outputting a DC voltage;

a smoothing capacitor for smoothing the DC voltage;

an inverter portion into which the DC voltage is input and which outputs AC power;

a regenerative braking portion connected in parallel with the smoothing capacitor; and a regenerative braking overcurrent detecting portion for outputting an overcurrent detection signal if the current flowing through the regenerative braking portion exceeds a determination value, wherein a current path is provided between a collector terminal or a drain terminal of a switching element and a negative voltage side of the DC voltage, outside the semiconductor package in which the switching element constituting the regenerative braking unit is incorporated.

13. A power conversion device that inputs AC voltage and outputs AC power, the device comprising:
   a rectifying portion for rectifying an AC voltage and outputting a DC voltage;
   a smoothing capacitor for smoothing the DC voltage;
   an inverter portion into which the DC voltage is input and which outputs AC power;
   a regenerative braking portion connected in parallel with the smoothing capacitor; and
   a regenerative braking overcurrent detecting portion for outputting an overcurrent detection signal if the current flowing through the regenerative braking portion exceeds a determination value,
   wherein a current path is provided between a collector terminal or a drain terminal of a switching element and a high voltage side of the DC voltage, outside the semiconductor package in which the switching element constituting the regenerative braking unit is incorporated.

14. The power conversion device according to claim 12, wherein
   the current path includes a diode or a resistor.

15. The power conversion device according to claim 12, wherein
   a resistance of the current path is lower than a resistance of the switching element in the off state.

\* \* \* \* \*